United States Patent
Balasubramanian et al.

(10) Patent No.: US 11,924,906 B2
(45) Date of Patent: Mar. 5, 2024

(54) ALIGNING DRX CYCLES USING SYSTEM LEVEL CONFIGURATION

(71) Applicant: QUALCOMM Incorporated, San Diego, CA (US)

(72) Inventors: Anantharaman Balasubramanian, San Diego, CA (US); Sudhir Kumar Baghel, Hillsborough, NJ (US); Shuanshuan Wu, San Diego, CA (US); Gabi Sarkis, San Diego, CA (US); Tien Viet Nguyen, Bridgewater, NJ (US); Kapil Gulati, Belle Mead, NJ (US); Chang-Sik Choi, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/147,223

(22) Filed: Jan. 12, 2021

(65) Prior Publication Data

US 2021/0219377 A1    Jul. 15, 2021

Related U.S. Application Data

(60) Provisional application No. 62/961,628, filed on Jan. 15, 2020.

(51) Int. Cl.
*H04W 76/28* (2018.01)
*H04W 76/11* (2018.01)
*H04W 76/27* (2018.01)

(52) U.S. Cl.
CPC ............ *H04W 76/28* (2018.02); *H04W 76/11* (2018.02); *H04W 76/27* (2018.02)

(58) Field of Classification Search
CPC ..... H04W 76/28; H04W 76/11; H04W 76/27; H04W 76/14; H04W 52/0219; H04W 52/0216; Y02D 30/70
See application file for complete search history.

(56) References Cited

U.S. PATENT DOCUMENTS

| 2015/0245295 A1* | 8/2015 | Jha ................... H04W 52/0206 370/311 |
| 2016/0242231 A1 | 8/2016 | Vajapeyam et al. |

(Continued)

FOREIGN PATENT DOCUMENTS

WO    WO-2020191524 A1    10/2020

OTHER PUBLICATIONS

3GPP TSG RAN WG2#98; R2-1704718; Source: Huawei, Hisilicon; Title: Some considerations about DRX on PC5, Hangzhou, China, May 15-19, 2017 (Year: 2017).*

(Continued)

*Primary Examiner* — Mohammed S Chowdhury
(74) *Attorney, Agent, or Firm* — Norton Rose Fulbright US LLP

(57) ABSTRACT

In a particular implementation, a method of wireless communication includes transmitting, from a first user equipment (UE) to a second UE, a radio resource control (RRC) request that includes a first discontinuous reception (DRX) preference at the first UE. The method also includes receiving, at the first UE from the second UE, a RRC setup message that includes a second DRX preference at the second UE. The method further includes transmitting, from the first UE to the second UE, a RRC setup complete message that includes an indication of a confirmed DRX cycle.

30 Claims, 14 Drawing Sheets

(56) References Cited

U.S. PATENT DOCUMENTS

| | | | | |
|---|---|---|---|---|
| 2016/0366645 | A1* | 12/2016 | Song | H04W 52/0229 |
| 2018/0220288 | A1* | 8/2018 | Agiwal | H04W 4/30 |
| 2019/0097874 | A1 | 3/2019 | Zhou et al. | |
| 2020/0305097 | A1* | 9/2020 | Bergquist | H04W 76/28 |
| 2021/0037468 | A1* | 2/2021 | Huang | H04W 76/14 |
| 2021/0050954 | A1* | 2/2021 | Ryu | H04W 72/02 |
| 2021/0120383 | A1* | 4/2021 | Park | H04W 76/15 |
| 2021/0120600 | A1* | 4/2021 | Park | H04W 76/34 |
| 2021/0195521 | A1* | 6/2021 | Müller | H04W 76/28 |
| 2021/0297842 | A1* | 9/2021 | Shrivastava | H04W 28/24 |
| 2021/0400584 | A1* | 12/2021 | Miao | H04L 5/005 |
| 2022/0007289 | A1* | 1/2022 | Seo | H04W 72/042 |
| 2023/0014303 | A1* | 1/2023 | Di Girolamo | H04W 72/20 |

OTHER PUBLICATIONS

3GPP TSG-RAN WG2 Meeting #97bis; R2-1703593; Source: Sequans Communications; Title: Discussion on paging relay and sidelink maintenance, Spokane, USA, Apr. 3-7, 2017 (Year: 2017).*
International Search Report and Written Opinion—PCT/US2021/01318—ISA/EPO—dated May 6, 2021 (201491WO).

* cited by examiner

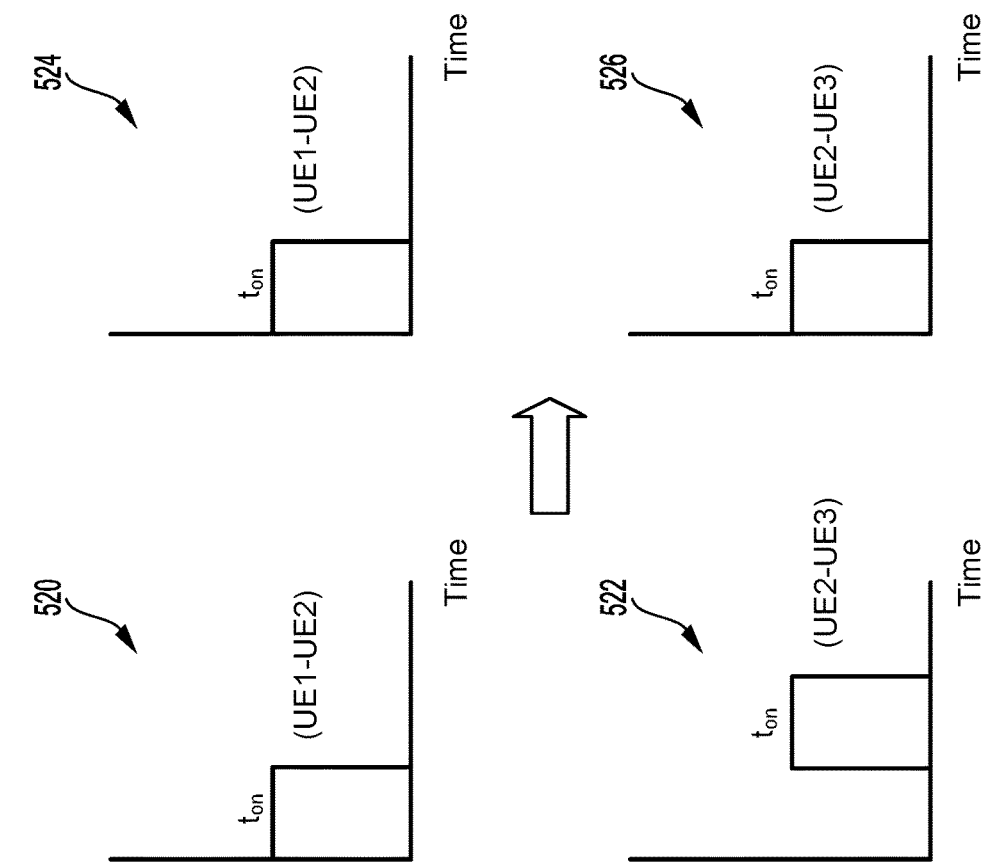
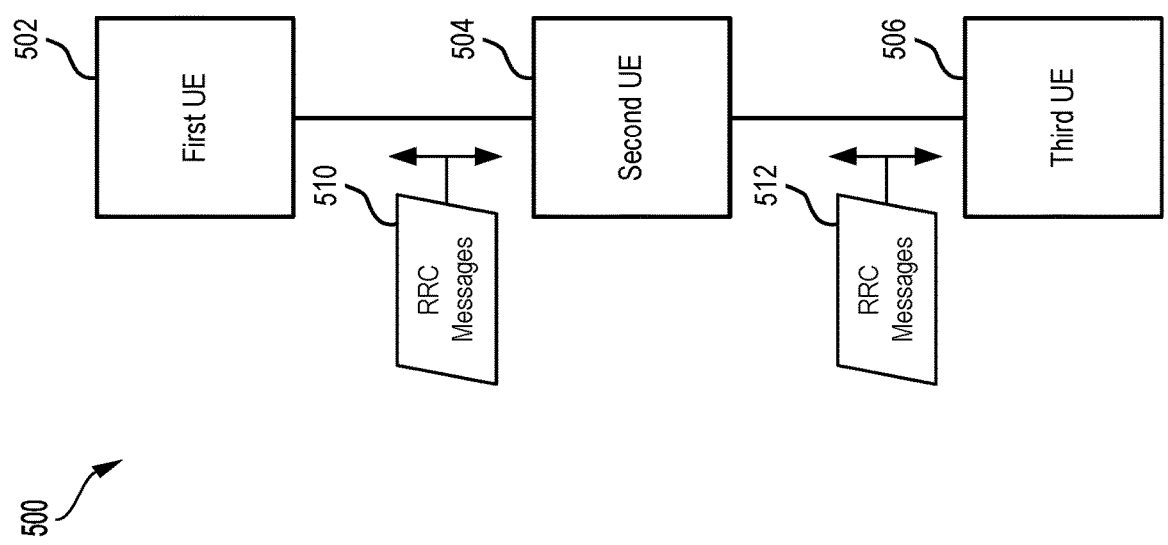
FIG. 5

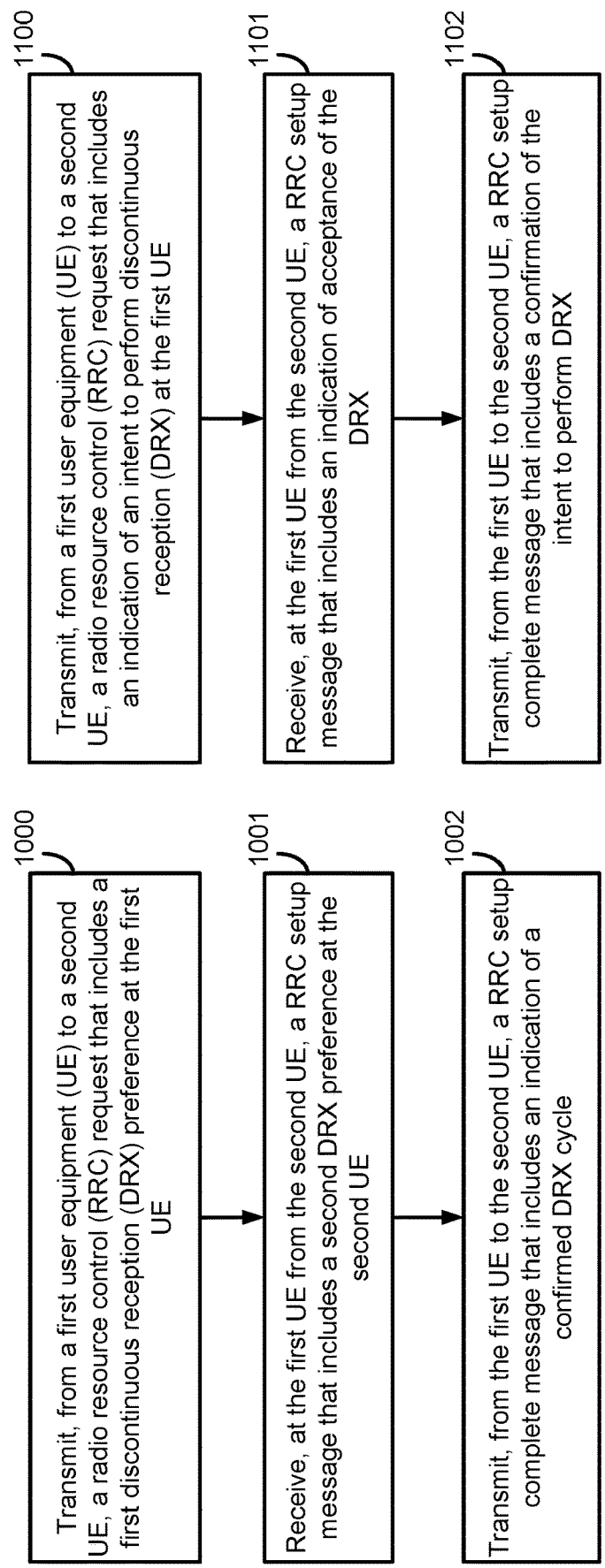

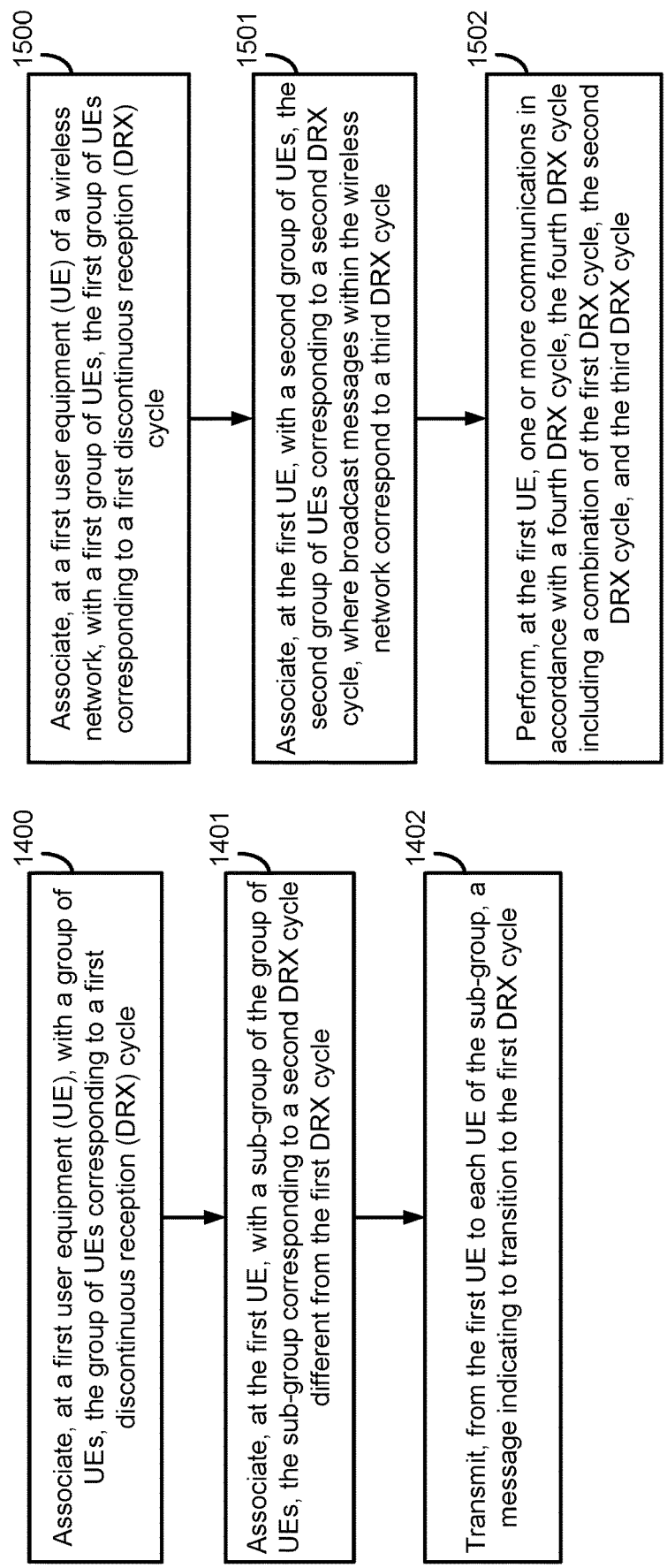

ALIGNING DRX CYCLES USING SYSTEM LEVEL CONFIGURATION

CROSS-REFERENCE TO RELATED APPLICATIONS

This application claims the benefit of U.S. Provisional Patent Application No. 62/961,628, entitled, "ALIGNING DRX CYCLES USING SYSTEM LEVEL CONFIGURATION," filed on Jan. 15, 2020, which is expressly incorporated by reference herein in its entirety.

TECHNICAL FIELD

Aspects of the present disclosure relate generally to wireless communication systems, and more particularly, to wireless communication systems that enable discontinuous reception. Certain aspects of the technology discussed below can enable and provide for aligning discontinuous reception cycles to reduce power consumption at user equipments (UEs) and manage congestion in a wireless network.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME ASPECTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes transmitting, from a first user equipment (UE) to a second UE, a radio resource control (RRC) request that includes a first discontinuous reception (DRX) preference at the first UE. The method also includes receiving, at the first UE from the second UE, a RRC setup message that includes a second DRX preference at the second UE. The method further includes transmitting, from the first UE to the second UE, a RRC setup complete message that includes an indication of a confirmed DRX cycle.

In an additional aspect of the disclosure, an apparatus configured for wireless communication is disclosed. The apparatus includes at least one processor, and a memory coupled to the at least one processor. The at least one processor is configured to initiate transmission, from a first user equipment (UE) to a second UE, of a radio resource control (RRC) request that includes a first discontinuous reception (DRX) preference at the first UE. The at least one processor is also configured to receive, at the first UE from the second UE, a RRC setup message that includes a second DRX preference at the second UE. The at least one processor is further configured to initiate transmission, from the first UE to the second UE, of a RRC setup complete message that includes an indication of a confirmed DRX cycle.

In an additional aspect of the disclosure, an apparatus configured for wireless communication is disclosed. The apparatus includes means for means for transmitting, from a first user equipment (UE) to a second UE, a radio resource control (RRC) request that includes a first discontinuous reception (DRX) preference at the first UE. The apparatus also includes means for receiving, at the first UE from the second UE, a RRC setup message that includes a second DRX preference at the second UE. The apparatus further includes means for transmitting, from the first UE to the second UE, a RRC setup complete message that includes an indication of a confirmed DRX cycle.

In an additional aspect of the disclosure, a non-transitory computer-readable medium stores instructions that, when executed by a processor, cause the processor to perform operations. The operations include initiating transmission, from a first user equipment (UE) to a second UE, of a radio resource control (RRC) request that includes a first discontinuous reception (DRX) preference at the first UE. The operations also include receiving, at the first UE from the second UE, a RRC setup message that includes a second DRX preference at the second UE. The operations further include initiating transmission, from the first UE to the second UE, of a RRC setup complete message that includes an indication of a confirmed DRX cycle.

In an additional aspect of the disclosure, a method of wireless communication includes transmitting, from a first user equipment (UE) to a second UE, a radio resource control (RRC) request that includes an indication of an intent to perform discontinuous reception (DRX) at the first UE. The method also includes receiving, at the first UE from the second UE, a RRC setup message that includes an indication of acceptance of the DRX. The method further includes transmitting, from the first UE to the second UE, a RRC setup complete message that includes a confirmation of the intent to perform DRX.

In an additional aspect of the disclosure, an apparatus configured for wireless communication is disclosed. The apparatus includes at least one processor, and a memory coupled to the at least one processor. The at least one processor is configured to initiate transmission, from a first user equipment (UE) to a second UE, of a radio resource control (RRC) request that includes an indication of an intent to perform discontinuous reception (DRX) at the first UE. The at least one processor is also configured to receive, at the first UE from the second UE, a RRC setup message that includes an indication of acceptance of the DRX. The at least one processor is further configured to initiate transmission, from the first UE to the second UE, of a RRC setup complete message that includes a confirmation of the intent to perform DRX.

In an additional aspect of the disclosure, an apparatus configured for wireless communication is disclosed. The apparatus includes means for transmitting, from a first user equipment (UE) to a second UE, a radio resource control (RRC) request that includes an indication of an intent to perform discontinuous reception (DRX) at the first UE. The apparatus also includes means for receiving, at the first UE from the second UE, a RRC setup message that includes an indication of acceptance of the DRX. The apparatus further includes means for transmitting, from the first UE to the second UE, a RRC setup complete message that includes a confirmation of the intent to perform DRX.

In an additional aspect of the disclosure, a non-transitory computer-readable medium stores instructions that, when executed by a processor, cause the processor to perform operations. The operations include initiating transmission, from a first user equipment (UE) to a second UE, of a radio resource control (RRC) request that includes an indication of an intent to perform discontinuous reception (DRX) at the first UE. The operations also include receiving, at the first UE from the second UE, a RRC setup message that includes an indication of acceptance of the DRX. The operations further include initiating transmission, from the first UE to the second UE, of a RRC setup complete message that includes a confirmation of the intent to perform DRX.

In an additional aspect of the disclosure, a method of wireless communication includes receiving, at a second user equipment (UE) from a first UE, a first radio resource control (RRC) request that includes a first discontinuous reception (DRX) preference at the first UE. The method includes receiving, at the second UE from a third UE, a second RRC request that includes a second DRX preference at the third UE. The method also includes transmitting, from the second UE to the first UE, a first RRC setup message that includes a third DRX preference at the second UE. The third DRX preference matches at least a portion of the first DRX preference or the second DRX preference. The method further includes transmitting, from the second UE to the third UE, a second RRC setup message that includes the third DRX preference.

In an additional aspect of the disclosure, an apparatus configured for wireless communication is disclosed. The apparatus includes at least one processor, and a memory coupled to the at least one processor. The at least one processor is configured to receive, at a second user equipment (UE) from a first UE, a first radio resource control (RRC) request that includes a first discontinuous reception (DRX) preference at the first UE. The at least one processor is configured to receive, at the second UE from a third UE, a second RRC request that includes a second DRX preference at the third UE. The at least one processor is also configured to initiate transmission, from the second UE to the first UE, of a first RRC setup message that includes a third DRX preference at the second UE. The third DRX preference matches at least a portion of the first DRX preference or the second DRX preference. The at least one processor is further configured to initiate transmission, from the second UE to the third UE, of a second RRC setup message that includes the third DRX preference.

In an additional aspect of the disclosure, an apparatus configured for wireless communication is disclosed. The apparatus includes means for receiving, at a second user equipment (UE) from a first UE, a first radio resource control (RRC) request that includes a first discontinuous reception (DRX) preference at the first UE. The apparatus includes means for receiving, at the second UE from a third UE, a second RRC request that includes a second DRX preference at the third UE. The apparatus also includes means for transmitting, from the second UE to the first UE, a first RRC setup message that includes a third DRX preference at the second UE. The third DRX preference matches at least a portion of the first DRX preference or the second DRX preference. The apparatus further includes means for transmitting, from the second UE to the third UE, a second RRC setup message that includes the third DRX preference.

In an additional aspect of the disclosure, a non-transitory computer-readable medium stores instructions that, when executed by a processor, cause the processor to perform operations. The operations include receiving, at a second user equipment (UE) from a first UE, a first radio resource control (RRC) request that includes a first discontinuous reception (DRX) preference at the first UE. The operations include receiving, at the second UE from a third UE, a second RRC request that includes a second DRX preference at the third UE. The operations also include initiating transmission, from the second UE to the first UE, of a first RRC setup message that includes a third DRX preference at the second UE. The third DRX preference matches at least a portion of the first DRX preference or the second DRX preference. The operations further include initiating transmission, from the second UE to the third UE, of a second RRC setup message that includes the third DRX preference.

In an additional aspect of the disclosure, a method of wireless communication includes associating, at a first user equipment (UE), with a first group of UEs. The first group of UEs correspond to a first discontinuous reception (DRX) cycle. The method also includes associating, at the first UE, with a second group of UEs. The second group of UEs correspond to a second DRX cycle. The method further includes performing, at the first UE, one or more communications in accordance with a third DRX cycle. The third DRX cycle includes a combination of the first DRX cycle and the second DRX cycle.

In an additional aspect of the disclosure, an apparatus configured for wireless communication is disclosed. The apparatus includes at least one processor, and a memory coupled to the at least one processor. The at least one processor is configured to associate, at a first user equipment (UE), with a first group of UEs. The first group of UEs corresponds to a first discontinuous reception (DRX) cycle. The at least one processor is also configured to associate, at the first UE, with a second group of UEs. The second group of UEs corresponds to a second DRX cycle. The at least one processor is further configured to initiate performance, at the first UE, of one or more communications in accordance with a third DRX cycle. The third DRX cycle includes a combination of the first DRX cycle and the second DRX cycle.

In an additional aspect of the disclosure, an apparatus configured for wireless communication is disclosed. The apparatus includes means for associating, at a first user equipment (UE), with a first group of UEs. The first group of UEs corresponds to a first discontinuous reception (DRX) cycle. The apparatus also includes means for associating, at the first UE, with a second group of UEs. The second group of UEs corresponds to a second DRX cycle. The apparatus further includes means for performing, at the first UE, one or more communications in accordance with a third DRX cycle. The third DRX cycle includes a combination of the first DRX cycle and the second DRX cycle.

In an additional aspect of the disclosure, a non-transitory computer-readable medium stores instructions that, when executed by a processor, cause the processor to perform operations. The operations include associating, at a first user equipment (UE), with a first group of UEs. The first group of UEs corresponds to a first discontinuous reception (DRX) cycle. The operations also include associating, at the first UE, with a second group of UEs. The second group of UEs corresponds to a second DRX cycle. The operations further include initiating performance, at the first UE, of one or more communications in accordance with a third DRX cycle. The third DRX cycle includes a combination of the first DRX cycle and the second DRX cycle.

In an additional aspect of the disclosure, a method of wireless communication includes associating, at a first user equipment (UE), with a group of UEs. The group of UEs corresponds to a first discontinuous reception (DRX) cycle. The method also includes associating, at the first UE, with a sub-group of the group of UEs. The sub-group corresponds to a second DRX cycle different from the first DRX cycle. The method further includes transmitting, from the first UE to each UE of the sub-group, a message indicating to transition to the first DRX cycle.

In an additional aspect of the disclosure, an apparatus configured for wireless communication is disclosed. The apparatus includes at least one processor, and a memory coupled to the at least one processor. The at least one processor is configured to associate, at a first user equipment (UE), with a group of UEs. The group of UEs corresponds to a first discontinuous reception (DRX) cycle. The at least one processor is also configured to associate, at the first UE, with a sub-group of the group of UEs. The sub-group corresponds to a second DRX cycle different from the first DRX cycle. The at least one processor is further configured to initiate transmission, from the first UE to each UE of the sub-group, of a message indicating to transition to the first DRX cycle.

In an additional aspect of the disclosure, an apparatus configured for wireless communication is disclosed. The apparatus includes means for associating, at a first user equipment (UE), with a group of UEs. The group of UEs corresponds to a first discontinuous reception (DRX) cycle. The apparatus also includes means for associating, at the first UE, with a sub-group of the group of UEs. The sub-group corresponds to a second DRX cycle different from the first DRX cycle. The apparatus further includes means for transmitting, from the first UE to each UE of the sub-group, a message indicating to transition to the first DRX cycle.

In an additional aspect of the disclosure, a non-transitory computer-readable medium stores instructions that, when executed by a processor, cause the processor to perform operations. The operations include associating, at a first user equipment (UE), with a group of UEs. The group of UEs corresponds to a first discontinuous reception (DRX) cycle. The operations also include associating, at the first UE, with a sub-group of the group of UEs. The sub-group corresponds to a second DRX cycle different from the first DRX cycle. The operations further include initiating transmission, from the first UE to each UE of the sub-group, of a message indicating to transition to the first DRX cycle.

In an additional aspect of the disclosure, a method of wireless communication includes associating, at a first user equipment (UE) of a wireless network, with a first group of UEs. The first group of UEs corresponds to a first discontinuous reception (DRX) cycle. The method also includes associating, at the first UE, with a second group of UEs. The second group of UEs corresponds to a second DRX cycle. Broadcast messages within the wireless network correspond to a third DRX cycle. The method further includes performing, at the first UE, one or more communications in accordance with a fourth DRX cycle. The fourth DRX cycle includes a combination of the first DRX cycle, the second DRX cycle, and the third DRX cycle.

In an additional aspect of the disclosure, an apparatus configured for wireless communication is disclosed. The apparatus includes at least one processor, and a memory coupled to the at least one processor. The at least one processor is configured to associate, at a first user equipment (UE) of a wireless network, with a first group of UEs. The first group of UEs corresponds to a first discontinuous reception (DRX) cycle. The at least one processor is also configured to associate, at the first UE, with a second group of UEs. The second group of UEs corresponds to a second DRX cycle. Broadcast messages within the wireless network correspond to a third DRX cycle. The at least one processor is further configured to initiate performance, at the first UE, of one or more communications in accordance with a fourth DRX cycle. The fourth DRX cycle includes a combination of the first DRX cycle, the second DRX cycle, and the third DRX cycle.

In an additional aspect of the disclosure, an apparatus configured for wireless communication is disclosed. The apparatus includes means for associating, at a first user equipment (UE) of a wireless network, with a first group of UEs. The first group of UEs corresponds to a first discontinuous reception (DRX) cycle. The apparatus also includes means for associating, at the first UE, with a second group of UEs. The second group of UEs corresponds to a second DRX cycle. Broadcast messages within the wireless network correspond to a third DRX cycle. The apparatus further includes means for performing, at the first UE, one or more communications in accordance with a fourth DRX cycle. The fourth DRX cycle includes a combination of the first DRX cycle, the second DRX cycle, and the third DRX cycle.

In an additional aspect of the disclosure, a non-transitory computer-readable medium stores instructions that, when executed by a processor, cause the processor to perform operations. The operations include associating, at a first user equipment (UE) of a wireless network, with a first group of UEs. The first group of UEs corresponds to a first discontinuous reception (DRX) cycle. The operations also include associating, at the first UE, with a second group of UEs. The second group of UEs corresponds to a second DRX cycle. Broadcast messages within the wireless network correspond to a third DRX cycle. The operations further include initiating performance, at the first UE, of one or more communications in accordance with a fourth DRX cycle. The fourth DRX cycle includes a combination of the first DRX cycle, the second DRX cycle, and the third DRX cycle.

In an additional aspect of the disclosure, a method of wireless communication includes associating, at a first user equipment (UE), with a base station. The base station assigns the first UE a first discontinuous reception (DRX) cycle. The method includes receiving, at the first UE from a second UE, a radio resource control (RRC) request that includes a first DRX preference at the second UE. The method also includes transmitting, from the first UE to the second UE, a RRC setup message that includes a second DRX preference at the first UE. The second DRX preference matches at least a portion of the first DRX cycle. The method further includes receiving, at the first UE from the second UE, a RRC setup complete message that includes an indication of a confirmed DRX cycle. The confirmed DRX cycle matches at least a portion of the first DRX cycle.

In an additional aspect of the disclosure, an apparatus configured for wireless communication is disclosed. The apparatus includes at least one processor, and a memory coupled to the at least one processor. The at least one processor is configured to associate, at a first user equipment (UE), with a base station. The base station assigns the first UE a first discontinuous reception (DRX) cycle. The at least one processor is configured to receive, at the first UE from a second UE, a radio resource control (RRC) request that includes a first DRX preference at the second UE. The at least one processor is also configured to initiate transmission, from the first UE to the second UE, of a RRC setup message that includes a second DRX preference at the first UE. The second DRX preference matches at least a portion of the first DRX cycle. The at least one processor is further configured to receive, at the first UE from the second UE, a RRC setup complete message that includes an indication of a confirmed DRX cycle. The confirmed DRX cycle matches at least a portion of the first DRX cycle.

In an additional aspect of the disclosure, an apparatus configured for wireless communication is disclosed. The apparatus includes means for associating, at a first user equipment (UE), with a base station. The base station assigns the first UE a first discontinuous reception (DRX) cycle. The apparatus includes means for receiving, at the first UE from a second UE, a radio resource control (RRC) request that includes a first DRX preference at the second UE. The apparatus also includes means for transmitting, from the first UE to the second UE, a RRC setup message that includes a second DRX preference at the first UE. The second DRX preference matches at least a portion of the first DRX cycle. The apparatus further includes means for receiving, at the first UE from the second UE, a RRC setup complete message that includes an indication of a confirmed DRX cycle. The confirmed DRX cycle matches at least a portion of the first DRX cycle.

In an additional aspect of the disclosure, a non-transitory computer-readable medium stores instructions that, when executed by a processor, cause the processor to perform operations. The operations include associating, at a first user equipment (UE), with a base station. The base station assigns the first UE a first discontinuous reception (DRX) cycle. The operations include receiving, at the first UE from a second UE, a radio resource control (RRC) request that includes a first DRX preference at the second UE. The operations also include initiating transmission, from the first UE to the second UE, of a RRC setup message that includes a second DRX preference at the first UE. The second DRX preference matches at least a portion of the first DRX cycle. The operations further include receiving, at the first UE from the second UE, a RRC setup complete message that includes an indication of a confirmed DRX cycle. The confirmed DRX cycle matches at least a portion of the first DRX cycle.

Other aspects, features, and aspects will become apparent to those of ordinary skill in the art, upon reviewing the following description of specific, exemplary aspects in conjunction with the accompanying figures. While features may be discussed relative to certain aspects and figures below, some aspects can include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects the exemplary aspects can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 5 is a block diagram illustrating details of a wireless communication system configured to align DRX cycles between three UEs.

FIG. 10 is a block diagram illustrating example blocks of a method of determining a DRX cycle between two UEs according to some aspects of the present disclosure.

FIG. 11 is a block diagram illustrating example blocks of a method of determining a DRX cycle between two UEs based on system-wide parameters according to some aspects of the present disclosure.

FIG. 14 is a block diagram illustrating example blocks of a method of aligning a DRX cycle of a sub-group of UEs with a DRX cycle of a group of UEs according to some aspects of the present disclosure.

FIG. 15 is a block diagram illustrating example blocks of a method of determining a DRX cycle in a wireless network according to some aspects of the present disclosure.

DETAILED DESCRIPTION

Figure 1:
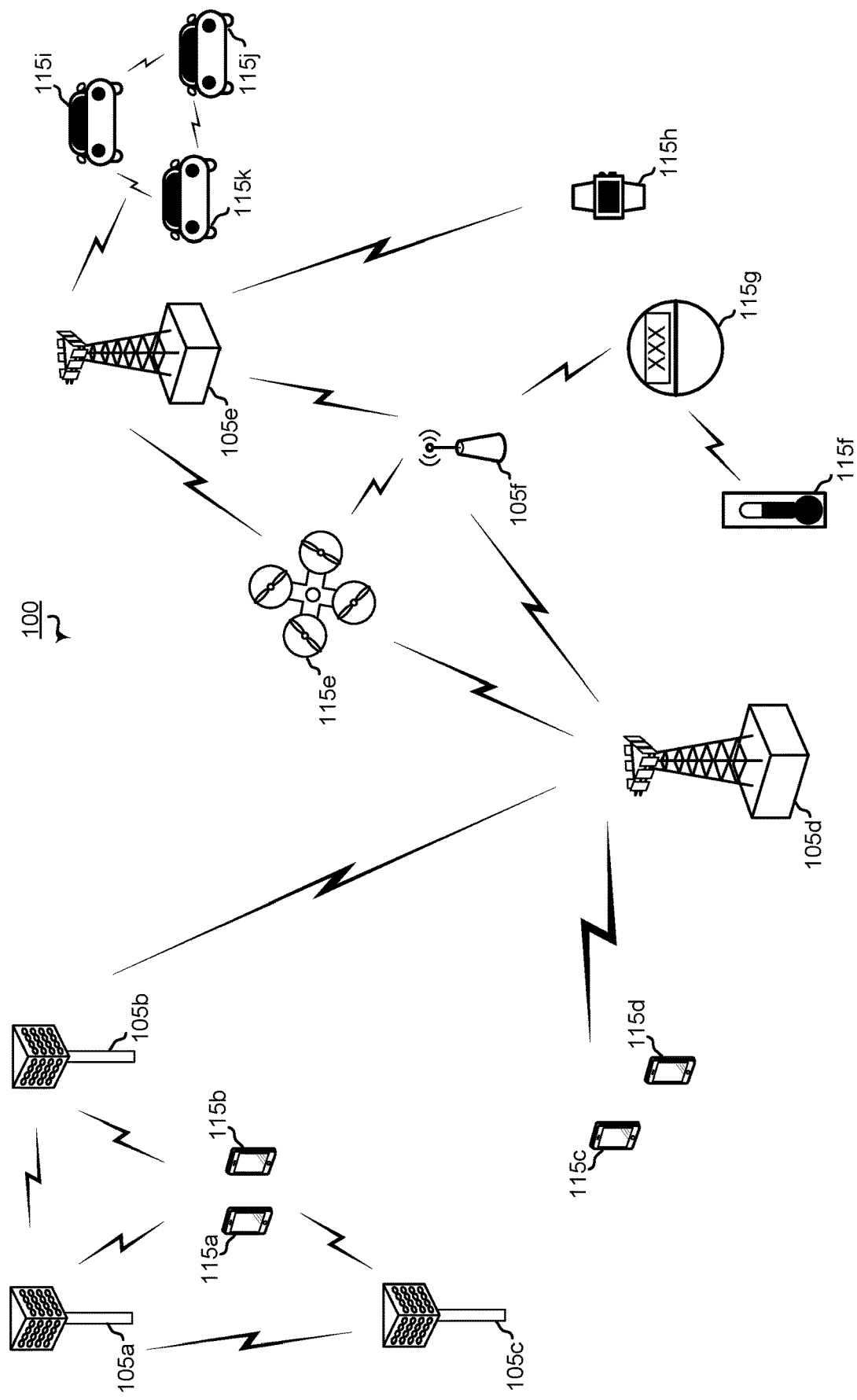
FIG. 1 is a block diagram illustrating details of a wireless communication system according to some aspects of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces, such as those of 5G NR.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations and/or uses may come about via integrated chip implementations and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described implementations. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 shows wireless network 100 for communication according to some aspects. Wireless network 100 may, for example, comprise a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may comprise a plurality of operator wireless networks), and may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a lightning bolt (e.g., communication link) indicates wireless transmissions between a UE and a serving base station, which is a base station designated to serve the UE on the downlink and/or uplink, or desired transmission between base stations, and backhaul transmissions between base stations. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of embodiments supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
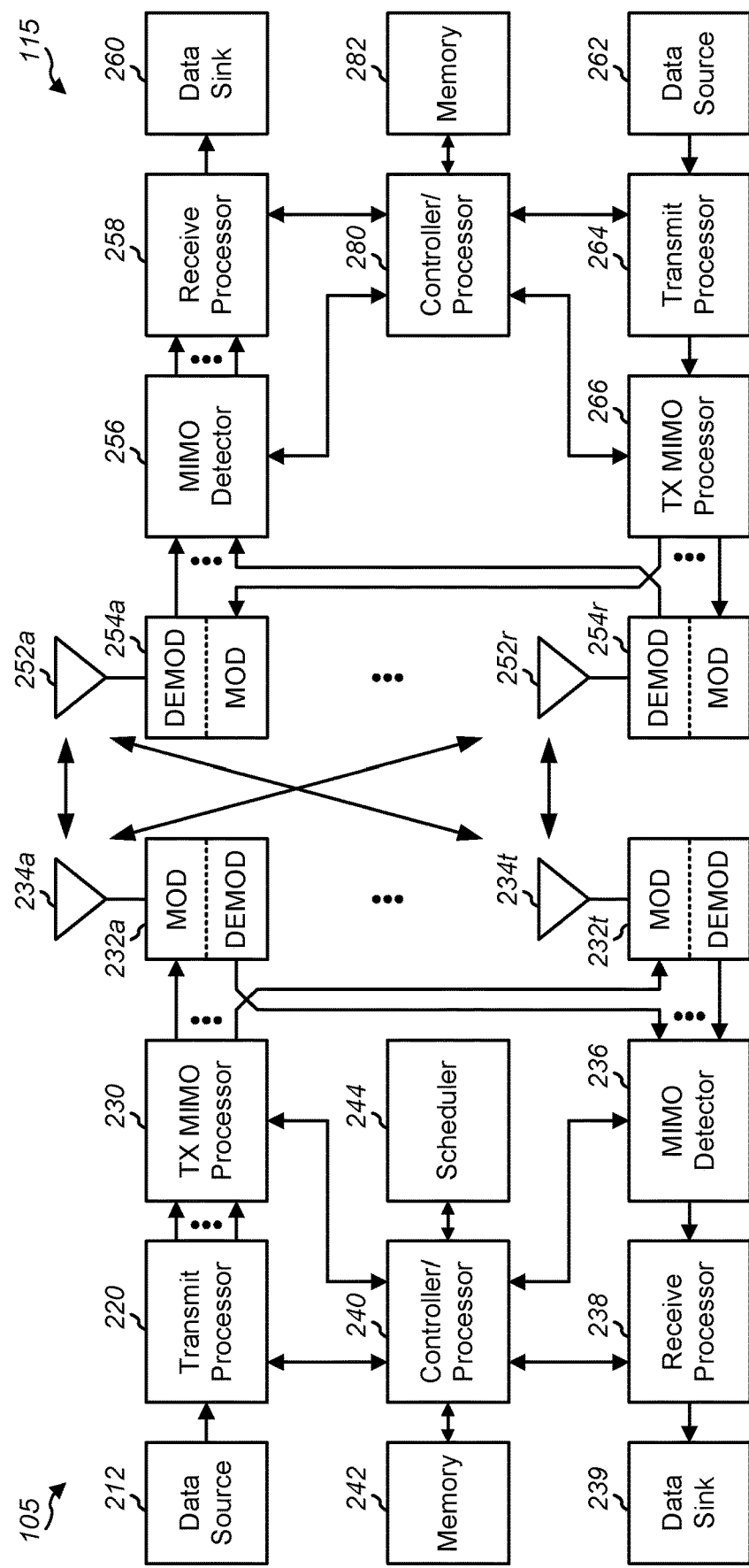
FIG. 2 is a block diagram conceptually illustrating a design of a base station and a UE configured according to some aspects of the present disclosure.

FIG. 2 shows a block diagram of a design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At the base station 105, a transmit processor 220 may receive data from a data source 212 and control information from a controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal. The symbols from the transmit processor 264 may be precoded by TX MIMO processor 266 if applicable, further processed by the modulators 254a through 254r (e.g., for SC-FDM, etc.), and transmitted to the base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 28 and/or other processors and modules at UE 115 may perform or direct the execution of various processes for the techniques described herein, such as to perform or direct the execution illustrated in FIGS. 10-16, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Wireless devices, such as UEs and base stations, may use a discontinuous reception (DRX) cycle to avoid monitoring (e.g., transmitting and/or receiving) a wireless channel for some periods of time, and instead enter a low-power operating mode to conserve power. For example, during a DRX cycle (e.g., a particular time period), a UE may operate in an active operating mode and monitor a wireless channel during a DRX on time period, and during the remainder of the DRX cycle, the UE may transition to a low-power operating mode (and refrain from monitoring the wireless channel) to conserve power. UEs can have multiple radio access technologies (RATs) that each have their own DRX cycle. For example, a first RAT of a UE may have a first DRX cycle, and a second RAT of the UE may have a second DRX cycle. Additionally, different transmission modes (e.g., unicast, groupcast/multicast, and/or broadcast) of the same RAT may have their own independent DRX cycles. If a UE has a sufficiently high number of different DRX cycles, the UE may be operating in the active operating mode (and monitoring one or more wireless channels) nearly all the time, thereby reducing the power savings provided by the DRX cycles. However, if all UEs coordinate their DRX cycles to be aligned, then all UEs may communicate on the wireless channel at the same time, causing congestion on the wireless channel and reducing throughput.

The present disclosure provides systems, devices, and methods for aligning some DRX cycles (to increase power saving efficiency) while distributing channel load to prevent congestion. In particular, the present disclosure provides techniques for aligning some DRX cycles across sidelinks (e.g., connections between two UEs without a base station) and between UEs and base stations. Sidelinks can include mobile phone to mobile phone connections, vehicle to vehicle connections, or other UE to UE connections. The techniques of the present disclosure enable UEs to align DRX cycles in some situations through the exchange of radio resource control (RRC) messages, such as RRC connection messages and RRC reconfiguration messages, while enabling the UEs to refrain from aligning DRX cycles in other situations (e.g., to reduce congestion on a wireless channel). The techniques provided herein apply to UE-to-UE connections (e.g., sidelink connections) and UE-to-base station connections (e.g., Uu connections), or combinations thereof. Aligning DRX cycles in some situations enables improved power savings at the UEs while refraining from aligning DRX cycles in other situations enables reduced congestion on the wireless channel, and thus improved throughput at the UEs.

Figure 3:
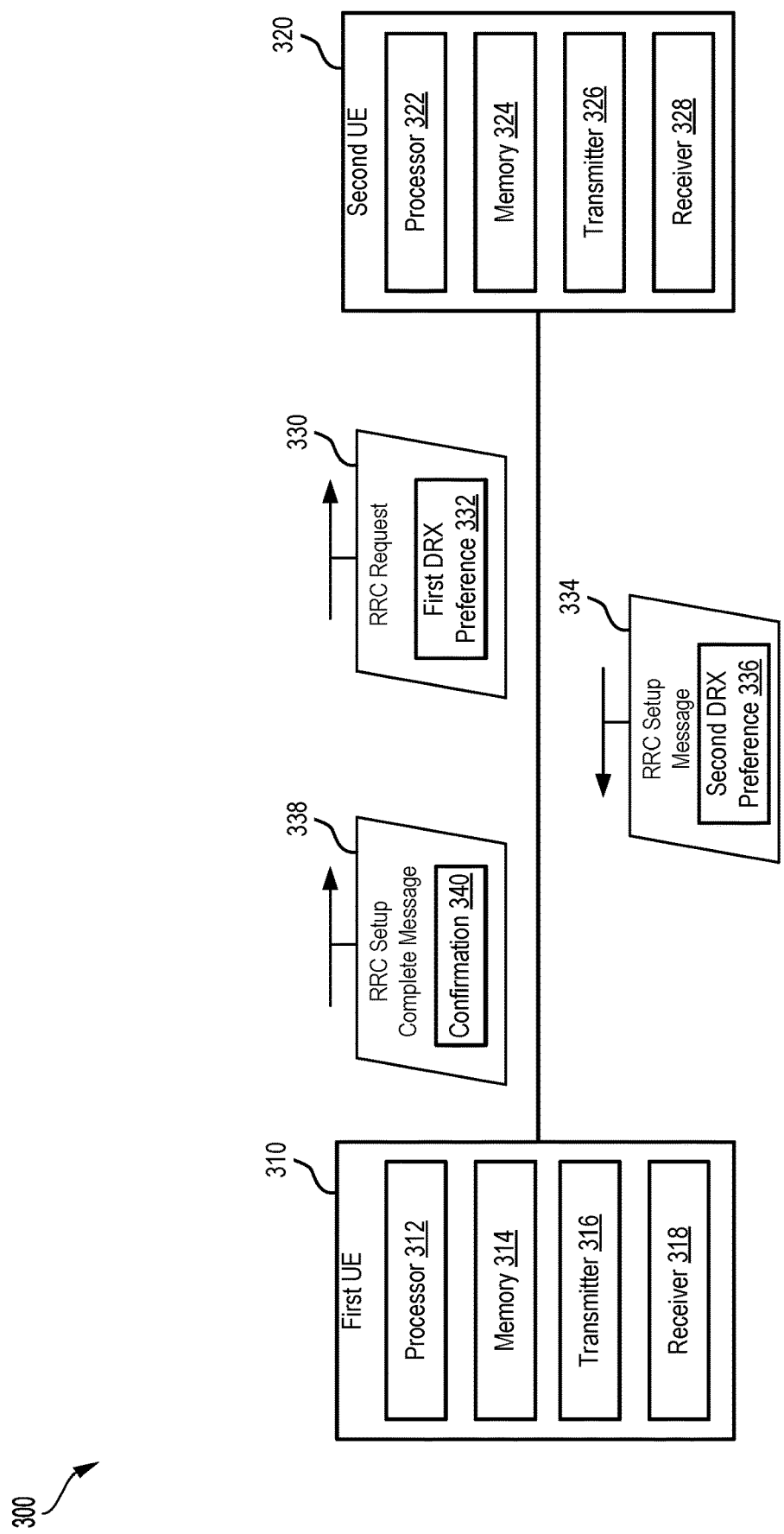
FIG. 3 is a block diagram illustrating details of a wireless communication system configured to align discontinuous reception (DRX) cycles between two user equipments (UEs).

FIG. 3 is a block diagram of an example wireless communications system 300 configured to align DRX cycles between two UEs. In some examples, wireless communications system 300 may implement aspects of wireless network 100. Wireless communications system 300 includes first UE 310 and second UE 320. First UE 310 and/or second UE 320 may include or correspond to UE 115. Although two UEs are illustrated, in other implementations, wireless communications system 300 may include more than two UEs, one or more base stations, or both.

First UE 310 can include a variety of components (e.g., structural, hardware components) used for carrying out one or more functions described herein. For example, these components can include a processor 312, a memory 314, a transmitter 316, and a receiver 318. Processor 312 may be configured to execute instructions stored at memory 314 to perform the operations described herein. In some implementations, processor 312 includes or corresponds to controller/processor 280, and memory 314 includes or corresponds to memory 282.

Transmitter 316 is configured to transmit data to one or more other devices, and receiver 318 is configured to receive data from one or more other devices. For example, transmitter 316 may transmit data, and receiver 318 may receive data, via a network, such as a wired network, a wireless network, or a combination thereof. For example, first UE 310 may be configured to transmit or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 316 and receiver 318 may be replaced with a transceiver. Additionally, or alternatively, transmitter 316, receiver 318, or both may include or correspond to one or more components of UE 115 described with reference to FIG. 2.

Second UE 320 can include a variety of components (e.g., structural, hardware components) used for carrying out one or more functions described herein. For example, these components can include processor 322, memory 324, transmitter 326, and receiver 328. Processor 322 may be configured to execute instructions stored at memory 324 to perform the operations described herein. In some implementations, processor 322 includes or corresponds to controller/processor 280, and memory 324 includes or corresponds to memory 282.

Transmitter 326 is configured to transmit data to one or more other devices, and receiver 328 is configured to receive data from one or more other devices. For example, transmitter 326 may transmit data, and receiver 328 may receive data, via a network, such as a wired network, a wireless network, or a combination thereof. For example, second UE 320 may be configured to transmit or receive data via a direct device-to-device connection, a LAN, a WAN, a modem-to-modem connection, the Internet, intranet, extranet, cable transmission system, cellular communication network, any combination of the above, or any other communications network now known or later developed within which permits two or more electronic devices to communicate. In some implementations, transmitter 326 and receiver 328 may be replaced with a transceiver. Additionally, or alternatively, transmitter 326, receiver, 328, or both may include or correspond to one or more components of UE 115 described with reference to FIG. 2.

In a particular implementation, wireless communications system 300 includes a 5G network. For example, first UE 310 and second UE 320 may include 5G UEs (e.g., UEs configured to operate in accordance with a 5G network).

During operation of wireless communications system 300, first UE 310 may initiate a unicast association process (e.g., a connection process or a reconfiguration process) with second UE 320. The unicast association process may be performed by exchanging one or more RRC messages between first UE 310 and second UE 320. During the exchange of RRC messages, first UE 310 and second UE 320 may indicate preferred DRX cycle information. For example, first UE 310 may transmit a RRC request 330 to second UE 320. RRC request 330 may include a RRC connection request, a RRC reconfiguration request, or any other type of RRC request that is used to associate, re-associate, or reconfigure an association between first UE 310 and second UE 320.

RRC request 330 includes a first DRX preference 332 at first UE 310. First DRX preference 332 may indicate a preferred alignment of a DRX cycle. For example, first DRX preference 332 may indicate a preferred time or times of a DRX on time period during the DRX cycle at first UE 310. First DRX preference 332 may be indicated with respect to a reference time that is negotiated by the UEs or that is set by a system-wide configuration. In some implementations, the preferred DRX on time period may be a DRX on time period of another DRX cycle at first UE 310, as further described herein.

Second UE 320 receives RRC request 330 from first UE 310 and identifies first DRX preference 332. Second UE 320 also transmits RRC setup message 334 to first UE 310 based on RRC request 330. RRC setup message 334 includes parameters used to setup an unicast connection between first UE 310 and second UE 320. RRC setup message 334 also includes second DRX preference 336 at second UE 320. Second DRX preference 336 may indicate a preferred alignment of a DRX cycle. For example, second DRX preference 336 may indicate a preferred time or times of a DRX on time period during the DRX cycle at second UE 320. Second DRX preference 336 may be indicated with respect to a reference time that is negotiated by the UEs or that is set by a system-wide configuration. In some implementations, the preferred DRX on time period may be a DRX on time period of another DRX cycle at second UE 320.

First UE 310 receives RRC setup message 334 including second DRX preference 336 and generates RRC setup complete message 338 that includes an indication of confirmation 340 (e.g., a confirmed DRX cycle). For example, first UE 310 may receive RRC setup message 334 and determine confirmation 340 (e.g., the confirmed DRX cycle) based on first DRX preference 332 and second DRX preference 336. To illustrate, the confirmed DRX cycle includes at least a portion of overlap between first DRX preference 332 and second DRX preference 336. For example, the DRX on time period of the confirmed DRX cycle may overlap a portion, or all, of the DRX on time period of first DRX preference 332 and a portion, or all, of the DRX on time period of second DRX preference 336. Thus, there is a consensus reached between first UE 310 and second UE 320 on when the DRX on time period occurs during the DRX cycle (e.g., such that DRX cycles between first UE 310 and second UE 320 are aligned). First UE 310 transmits RRC setup complete message 338 to second UE 320, and second UE 320 processes RRC setup complete message 338 to determine the confirmed DRX cycle (e.g., corresponding to confirmation 340) such that DRX cycles between first UE 310 and second UE 320 are aligned.

After transmitting RRC setup complete message 338, first UE 310 and second UE 320 may perform one or more communications in accordance with the confirmed DRX cycle (corresponding to confirmation 340). For example, first UE 310 and second UE 320 may operate in active operating modes during a DRX on time period to monitor a wireless channel, and first UE 310 and second UE 320 may operate in a low power operating mode during the remainder of the DRX cycle to reduce power consumption at first UE 310 and second UE 320.

In some implementations, transmitting (and receiving) RRC request 330, receiving (and transmitting) RRC setup message 334, and transmitting (and receiving) RRC setup complete message 338 are performed during a unicast messaging process between first UE 310 and second UE 320. For example, the RRC messages may be exchanged via unicast messages over a sidelink (e.g., directly between first UE 310 and second UE 320, without using a base station). Additionally, or alternatively, RRC request 330, RRC setup message 334, and RRC setup complete message 338 may be exchanged during a connection process, a reconfiguration process, or another type of RRC process. For example, RRC request 330 may include a RRC connection request, RRC setup message 334 may include a RRC connection setup message, and RRC setup complete message 338 may include a RRC connection setup complete message. In other implementations, RRC request 330 includes a RRC reconfiguration request, RRC setup message 334 includes a RRC reconfiguration setup message, and RRC setup complete message 338 includes a RRC reconfiguration setup complete message.

In some implementations, determining the alignment of the DRX cycles is performed at second UE 320. For example, based on receiving RRC request 330, second UE 320 may select second DRX preference 336 that at least partially matches first DRX preference 332 (e.g., has a DRX on time period that at least partially overlaps with a DRX on time period of first DRX preference 332). In such implementations, second DRX preference 336 indicates the DRX cycle to be used by first UE 310 and second UE 320 (e.g., first UE 310 does not have to determine whether there is overlap between first DRX preference 332 and second DRX preference 336).

If there is no overlap between DRX cycles the UEs, then DRX operations may not be performed. For example, first UE 310 may transmit a second RRC request to a third UE (not shown for convenience). The second RRC request may include a third DRX preference at first UE 310. First UE 310 may receive a second RRC setup message from the third UE. If there is no overlap between the third DRX preference and a fourth DRX preference at the third UE, the second RRC setup message includes an indication of a denial of setup (e.g., denial of DRX setup). Based on the indication of denial of setup, first UE 310 terminates a unicast message process between first UE 310 and the third UE.

Thus, FIG. 3 describes a process of aligning DRX cycles between two UEs that are connected via a sidelink. Aligning the DRX cycles may reduce power consumption at the UEs, as compared to causing the UEs to each use two different DRX cycles, because the UEs are only monitoring the channel (e.g., in the active operating mode) for one DRX on time period.

Figure 4:
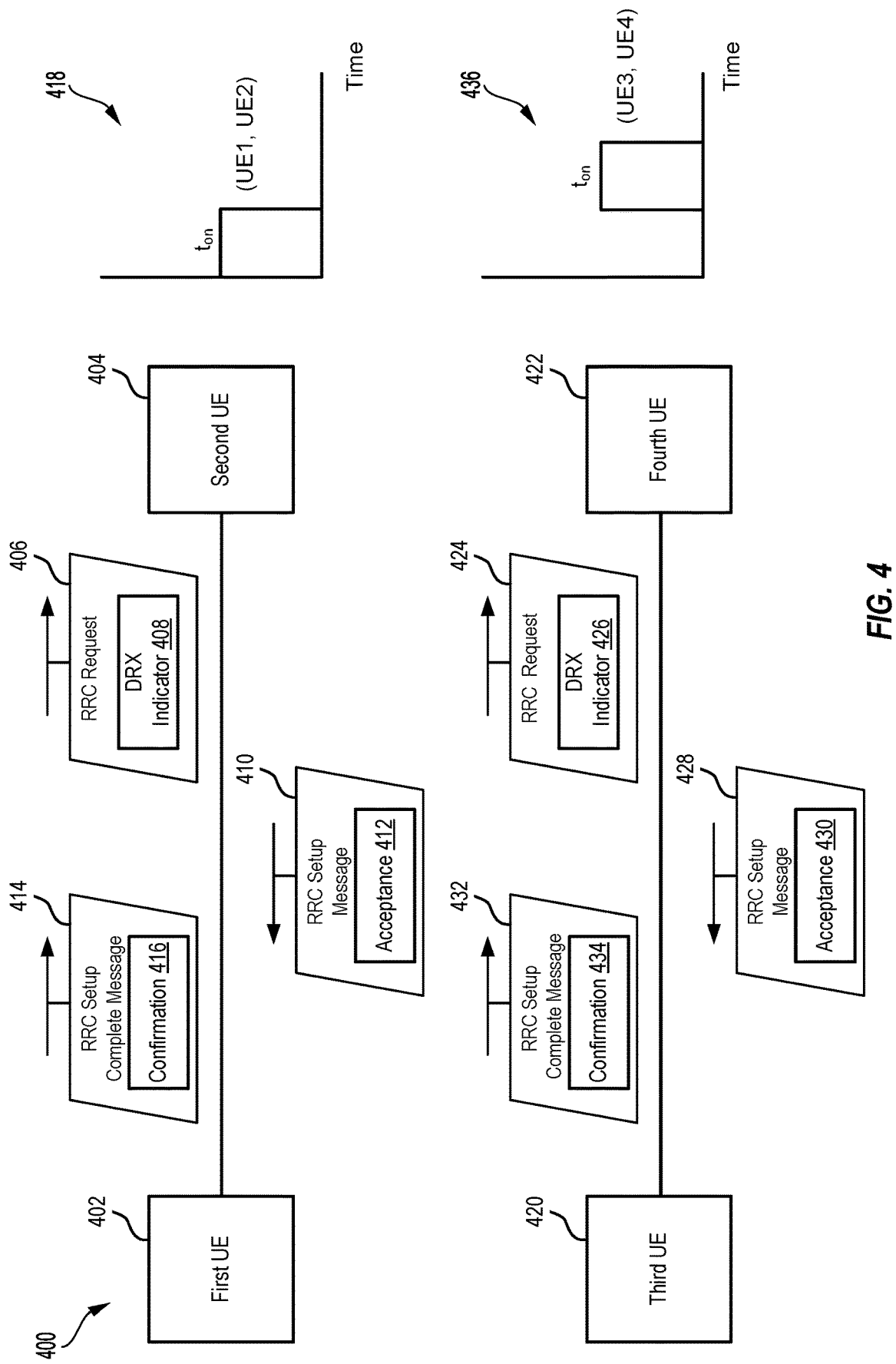
FIG. 4 is a block diagram illustrating details of a wireless communication system configured to align DRX cycles between two UEs.

FIG. 4 is a block diagram of an example wireless communications system 400 configured to align DRX cycles between two UEs. Wireless communications system 400 includes first UE 402, second UE 404, third UE 420, and fourth UE 422. First UE 402, second UE 404, third UE 420, and fourth UE 422 may include components similar to described in FIG. 3, such as processors, memories, transmitters, and receivers, which are not shown for convenience, Although four UEs are illustrated, in other implementations, wireless communications system 400 may include fewer than four or more than four UEs, one or more base stations, or both.

During operation of wireless communications system 400, first UE 402 may initiate a unicast association process (e.g., a connection process or a reconfiguration process) with second UE 404. The unicast association process may include the exchange of RRC messages between first UE 402 and second UE 404. Additionally, one or more parameters for DRX may be defined by a system-wide configuration. For example, a common reference (e.g., in terms of system frame number, subframe/slot number, etc.) with respect to which the DRX cycle is to begin may be defined. As another example, the time period T over which the DRX cycle is performed may be defined. As another example, a DRX on time period $t_{on}$ for the UEs may be defined. As another example, a number of intervals N included in the time period T may be defined. N may be determined according to $T=N*t_{on}$. These parameters may be used in determining DRX cycles at UEs, as further described herein.

The unicast association process may include first UE 402 transmitting RRC request 406 to second UE 404. RRC request 406 includes DRX indicator 408 (e.g., an indication of an intent to perform DRX at first UE 402). DRX indicator 408 may be a field in RRC request 406, such as one or more bits having a particular value indicating that DRX is requested by first UE 402. Second UE 404 receives RRC request 406 and determines whether second UE 404 can support DRX.

After processing RRC request 406, second UE 404 transmits RRC setup message 410 to first UE 402. If second UE 404 can support DRX, RRC setup message 410 includes acceptance 412 (e.g., an indication of acceptance of the DRX). Acceptance 412 may include a field in RRC setup message 410, such as one or more bits having a particular value indicating that DRX is accepted by second UE 404.

RRC setup message 410 may also include parameters used to set up the unicast connection. If second UE 404 cannot support DRX, RRC setup message 410 includes a denial of DRX instead of acceptance 412.

First UE 402 receives RRC setup message 410 and processes RRC setup message 410 to determine the parameters and whether or not DRX is accepted. After processing RRC setup message 410, first UE 402 transmits RRC setup complete message 414 to second UE 404. RRC setup complete message 414 indicates that RRC setup is complete. Additionally, RRC setup complete message 414 may include confirmation 416 (e.g., confirmation of the intent to perform DRX by first UE 402). In this manner, the exchange of RRC messages 406, 410, and 414 enable the setting up of a unicast connection and performance of DRX. If RRC setup message 410 includes a denial of DRX (instead of acceptance 412), RRC setup complete message 414 does not include confirmation 416, and DRX is not performed by first UE 402 and second UE 404.

After transmitting RRC setup complete message 414, first UE 402 and second UE 404 may perform one or more communications in accordance with a DRX cycle determined based on the system-wide parameters. For example, first UE 402 and second UE 404 may operate in active operating modes during a DRX on time period to monitor a wireless channel, and first UE 402 and second UE 404 may operate in a low power operating mode during the remainder of the DRX cycle to reduce power consumption at first UE 402 and second UE 404. The DRX cycle may be determined based on a particular identifier and a number of intervals (e.g., N) included in a DRX cycle (e.g., T). For example, the DRX cycle may be determined based on the formula: particular identifier mod N. In some implementations, the particular identifier includes an identifier of first UE 402 (e.g., source ID). For example, source ID may be a level 1 identifier, a level 2 identifier, or another identifier of first UE 402. In other implementations, the particular identifier includes an identifier of second UE 404 (e.g., destination ID). For example, destination ID may be a level 1 identifier, a level 2 identifier, or another identifier of second UE 404. Destination ID may be the ID to which UE addresses RRC request 406 and RRC setup complete message 414. In other implementations, the particular identifier includes an identifier based on a connection identifier between first UE 402 and second UE 404. The particular identifier (e.g., source ID, destination ID, or the connection identifier) that is used may be specified by a wireless standard, such as a 3GPP standard, as a non-limiting example.

In some implementations, transmitting (and receiving) RRC request 406, receiving (and transmitting) RRC setup message 410, and transmitting (and receiving) RRC setup complete message 414 are performed during a unicast messaging process between first UE 402 and second UE 404. For example, the RRC messages may be exchanged via unicast messages over a sidelink (e.g., directly between first UE 402 and second UE 404, without using a base station). Additionally, or alternatively, RRC request 406, RRC setup message 410, and RRC setup complete message 414 may be exchanged during a connection process, a reconfiguration process, or another type of RRC process. For example, RRC request 406 may include a RRC connection request, RRC setup message 410 may include a RRC connection setup message, and RRC setup complete message 414 may include a RRC connection setup complete message. In other implementations, RRC request 406 includes a RRC reconfiguration request, RRC setup message 410 includes a RRC reconfiguration setup message, and RRC setup complete message 414 includes a RRC reconfiguration setup complete message.

FIG. 4 also includes a graph 418 of the DRX cycle used by first UE 402 and second UE 404. In the implementation illustrated in FIG. 4, particular identifier mod N is equal to zero such that $t_{on}$ for first UE 402 and second UE 404 begins at the reference time period (e.g., at time=zero). Particular identifier may include an identifier of first UE 402, an identifier of second UE 404, or a connection identifier between first UE 402 and second UE 404. First UE 402 and second UE 404 operate in an active operating mode during $t_{on}$ to monitor the wireless channel and/or perform communications. Subsequent to $t_{on}$ is a remainder of the DRX cycle T during which first UE 402 and second UE 404 may operate in a low power operating mode (e.g., not monitor the wireless channel).

In addition to the unicast association process performed by first UE 402 and second UE 404, third UE 420 performs a unicast association process with fourth UE 422. The unicast association process may include third UE 420 transmitting RRC request 424 to fourth UE 422. RRC request 424 includes DRX indicator 426 (e.g., an indication of an intent to perform DRX at third UE 420). DRX indicator 426 may include a field in RRC request 424, such as one or more bits having a particular value indicating that DRX is requested by third UE 420. Fourth UE 422 receives RRC request 424 and determines whether fourth UE 422 can support DRX.

After processing RRC request 424, fourth UE 422 transmits RRC setup message 428 to third UE 420. If fourth UE 422 can support DRX, RRC setup message 428 includes acceptance 430 (e.g., an indication of acceptance of the DRX). Acceptance 430 may be a field in RRC setup message 428, such as one or more bits having a particular value indicating that DRX is accepted by fourth UE 422. RRC setup message 428 may also include parameters used to set up the unicast connection.

Third UE 420 receives RRC setup message 428 and processes RRC setup message 428 to determine the parameters and whether or not DRX is accepted. After processing RRC setup message 428, third UE 420 transmits RRC setup complete message 432 to fourth UE 422. RRC setup complete message 432 indicates that RRC setup is complete. Additionally, RRC setup complete message 432 may include confirmation 434 (e.g., confirmation of the intent to perform DRX by third UE 420). In this manner, the exchange of RRC messages 424, 428, and 432 enable the setting up of a unicast connection and performance of DRX. RRC messages 424, 428, and 432 may be RRC connection messages, RRC reconfiguration messages, or any other type of RRC message used in a unicast association (or re-association) process.

After transmitting RRC setup complete message 432, third UE 420 and fourth UE 422 may perform one or more communications in accordance with a DRX cycle determined based on the system-wide parameters. For example, third UE 420 and fourth UE 422 may operate in active operating modes during a DRX on time period to monitor a wireless channel, and third UE 420 and fourth UE 422 may operate in a low power operating mode during the remainder of the DRX cycle to reduce power consumption at third UE 420 and fourth UE 422. The DRX cycle may be determined based on a particular identifier and a number of intervals (e.g., N) included in a DRX cycle (e.g., T). For example, the DRX cycle may be determined based on the formula: particular identifier mod N. In some implementations, the particular identifier includes an identifier of third UE 420

(e.g., source ID). For example, source ID may be a level 1 identifier, a level 2 identifier, or another identifier of third UE 420. In other implementations, the particular identifier includes an identifier of fourth UE 422 (e.g., destination ID). For example, destination ID may be a level 1 identifier, a level 2 identifier, or another identifier of fourth UE 422. Destination ID may be the ID to which UE addresses RRC request 424 and RRC setup complete message 432. In other implementations, the particular identifier includes an identifier based on a connection identifier between third UE 420 and fourth UE 422. The particular identifier (e.g., source ID, destination ID, or the connection identifier) that is used may be specified by a wireless standard, such as a 3GPP standard, as a non-limiting example.

FIG. 4 also includes a graph 436 of the DRX cycle used by third UE 420 and fourth UE 422. In the implementation illustrated in FIG. 4, particular identifier mod N is equal to a positive value such that $t_{on}$ for third UE 420 and fourth UE 422 begins an offset subsequent to the reference time period. Particular identifier may include an identifier of third UE 420, an identifier of fourth UE 422, or a connection identifier between third UE 420 and fourth UE 422. Third UE 420 and fourth UE 422 operate in an active operating mode during $t_{on}$ to monitor the wireless channel and/or perform communications. Before and subsequent to $t_{on}$ is a remainder of the DRX cycle T during which third UE 420 and fourth UE 422 may operate in a low power operating mode (e.g., not monitor the wireless channel).

Thus, FIG. 4 describes UEs aligning DRX cycles using system-wide parameters. For example, first UE 402 and second UE 404 may align DRX cycles, and third UE 420 and fourth UE 422 may align DRX cycles. Aligning DRX cycles reduces power consumption at the UEs. Additionally, because the DRX on time periods are determined based on different identifiers, the DRX on time period for first UE 402 and second UE 404 is different than the DRX on time period for third UE 420 and fourth UE 422. Having different DRX on time periods for different UEs distributes the communication load across different time slots, thereby reducing congestion on wireless channels.

FIG. 5 is a block diagram of an example wireless communications system 500 configured to align DRX cycles between three UEs. Wireless communications system 500 includes first UE 502, second UE 504, and third UE 506. First UE 502, second UE 504, and third UE 506 may include components similar to described in FIG. 3, such as processors, memories, transmitters, and receivers, which are not shown for convenience, Although three UEs are illustrated, in other implementations, wireless communications system 500 may include fewer than three or more than three UEs, one or more base stations, or both.

During operation of wireless communications system 500, first UE 502 may complete an association process (or a re-association or reconfiguration process) with second UE 504. For example, first UE 502 may exchange RRC messages 510 with second UE 504. RRC messages 510 may include a RRC request, a RRC setup message, and a RRC setup complete message, as described with reference to FIGS. 3 and 4. Additionally, RRC messages 510 may include DRX information that enables first UE 502 and second UE 504 to perform DRX according to a first DRX cycle. In some implementations, the DRX information is indicated as described with reference to FIG. 3. In other implementations, the DRX information is indicated as described with reference to FIG. 4. Additionally, third UE 506 may complete an association process (or a re-association or reconfiguration process) with second UE 504. For example, third UE 506 may exchange RRC messages 512 with second UE 504. RRC messages 512 may include a RRC request, a RRC setup message, and a RRC setup complete message, as described with reference to FIGS. 3 and 4. Additionally, RRC messages 512 may include DRX information that enables third UE 506 and second UE 504 to perform DRX according to a third DRX cycle. In some implementations, the DRX information is indicated as described with reference to FIG. 3. In other implementations, the DRX information is indicated as described with reference to FIG. 4.

Second UE 504 may align the first DRX cycle with the second DRX cycle to increase the amount of time that second UE 504 operates in the low power operating mode, thereby reducing power consumption at second UE 504. To illustrate, second UE 504 may receive, from first UE 502, a first RRC request that includes a first DRX preference at first UE 502 (or an indication of an intent to perform DRX). Second UE 504 may also receive, from third UE 506, a second RRC request that includes a second DRX preference at third UE 506 (or an indication of an intent to perform DRX). Second UE 504 may determine a third DRX preference that matches at least a portion of the first DRX preference or the second DRX preference. For example, the DRX on time period of the third DRX preference may match at least a portion of the DRX on time period of the first DRX preference and/or the second DRX preference. In some implementations, the third DRX preference matches at least a portion of the first DRX preference. In other implementations, the third DRX preference matches at least a portion of the second DRX preference. Second UE 504 may transmit, to first UE 502, a first RRC setup message that includes the third DRX preference at second UE 504 (or acceptance of the DRX). Additionally, Second UE 504 may transmit, to third UE 506, a second RRC setup message that includes the third DRX preference (or acceptance of the DRX). In this manner, second UE 504 may align the DRX cycles between first UE 502 and second UE 504 and between second UE 504 and third UE 506.

To further illustrate, FIG. 5 includes graph 520 that shows the first DRX cycle between first UE 502 and second UE 504 before alignment, and graph 522 that shows the second DRX cycle between second UE 504 and third UE 506 before alignment. As can be seen in FIG. 5, the DRX on time periods do not overlap between the first DRX cycle and the second DRX cycle. FIG. 5 also illustrates graph 524 that shows the first DRX cycle between first UE 502 and second UE 504 after alignment, and graph 526 that shows the second DRX cycle between second UE 504 and third UE 506 after alignment. As can be seen in FIG. 5, after alignment, the DRX on time period is the same in the first DRX cycle and the second DRX cycle. Thus, second UE 504 only operates in the active operating mode (e.g., monitors a wireless channel) during one DRX on time period, instead of two, which reduces power consumption at second UE 504. In the implementation illustrated in FIG. 5, the second DRX cycle is aligned with the first DRX cycle. In other implementations, the first DRX cycle may be aligned with the second DRX cycle (e.g., the aligned DRX on time period may match the original DRX on time period of the second DRX cycle).

After transmitting the first RRC setup message (included in RRC messages 510) and the second RRC setup message (included in RRC messages 512), second UE 504 may receive RRC setup complete messages from first UE 502 and third UE 506. The RRC setup complete messages include an indication of a confirmed DRX cycle (or confirmation that DRX is accepted). After receiving the RRC setup complete messages (included in RRC messages 510 and RRC messages 512), performance of one or more communications between first UE 502 and second UE 504 and between second UE 504 and third UE 506 in accordance with the confirmed DRX cycle (or in accordance with a DRX cycle determined based on system-wide parameters) occurs. RRC messages 510 and RRC messages 512 may include RRC connection messages, RRC reconfiguration messages, or other types of RRC messages.

Although FIG. 5 illustrates an implementation where second UE 504 aligns DRX cycles, in alternate implementations, a common UE follows the DRX cycles of each of its links, while the other UEs only follow their corresponding DRX cycle. For example, if first UE 502 corresponds to the first DRX cycle, and third UE 506 corresponds to the second DRX cycle, second UE 504 operates in accordance with both the first DRX cycle and the second DRX cycle (e.g., second UE 504 has two DRX on time periods, one corresponding to the first DRX cycle and one corresponding to the second DRX cycle).

To further illustrate, second UE 504 may receive, from a fourth UE, a third RRC request that includes a fourth DRX preference at the fourth UE. Second UE 504 may also receive, from a fifth UE, a fourth RRC request that includes a fifth DRX preference at the fifth UE. Second UE 504 may transmit, to the fourth UE, a third RRC setup message that includes a sixth DRX preference at the second UE. The sixth DRX preference matches at least a portion of the fourth DRX preference. Second UE 504 may also transmit, to the fifth UE, a fourth RRC setup message that includes a seventh DRX preference at the second UE. The seventh DRX preference matches at least a portion of the fifth DRX preference. Second UE 504 may receive, from the fourth UE, a first RRC setup complete message that includes an indication of a first confirmed DRX cycle. One or more communications in accordance with the first confirmed DRX cycle may be performed between second UE 504 and the fourth UE. Additionally, second UE 504 may receive, from the fifth UE, a second RRC setup complete message that includes an indication of a second confirmed DRX cycle. One or more communications in accordance with the second confirmed DRX cycle may be performed between second UE 504 and the fifth UE. The second confirmed DRX cycle may be different than the first confirmed DRX cycle, such that second UE 504 corresponds to two DRX on time periods.

In some implementations, second UE 504 may select whether to align the DRX cycles or not to align the DRX cycles. The determination may be based on a power supply or remaining battery level at second UE 504 or a capability of second UE 504. For example, if the remaining power level (e.g., battery level) of second UE fails to satisfy a threshold, second UE may select to align the DRX cycles (e.g., to determine the third DRX preference) in order to conserver the remaining power level. Alternatively, if the remaining power level satisfies a threshold, or if second UE 504 is connected to a fixed power supply, second UE 504 may select to not align the DRX cycles (e.g., to determine the sixth DRX preference and the seventh DRX preference) in order to reduce congestion on the wireless channels and improve throughput. Thus, FIG. 5 describes UEs that align DRX cycles in some circumstances to reduce power consumption and that do not align DRX cycles in other circumstance to reduce congestion on a wireless channel.

Figure 6:
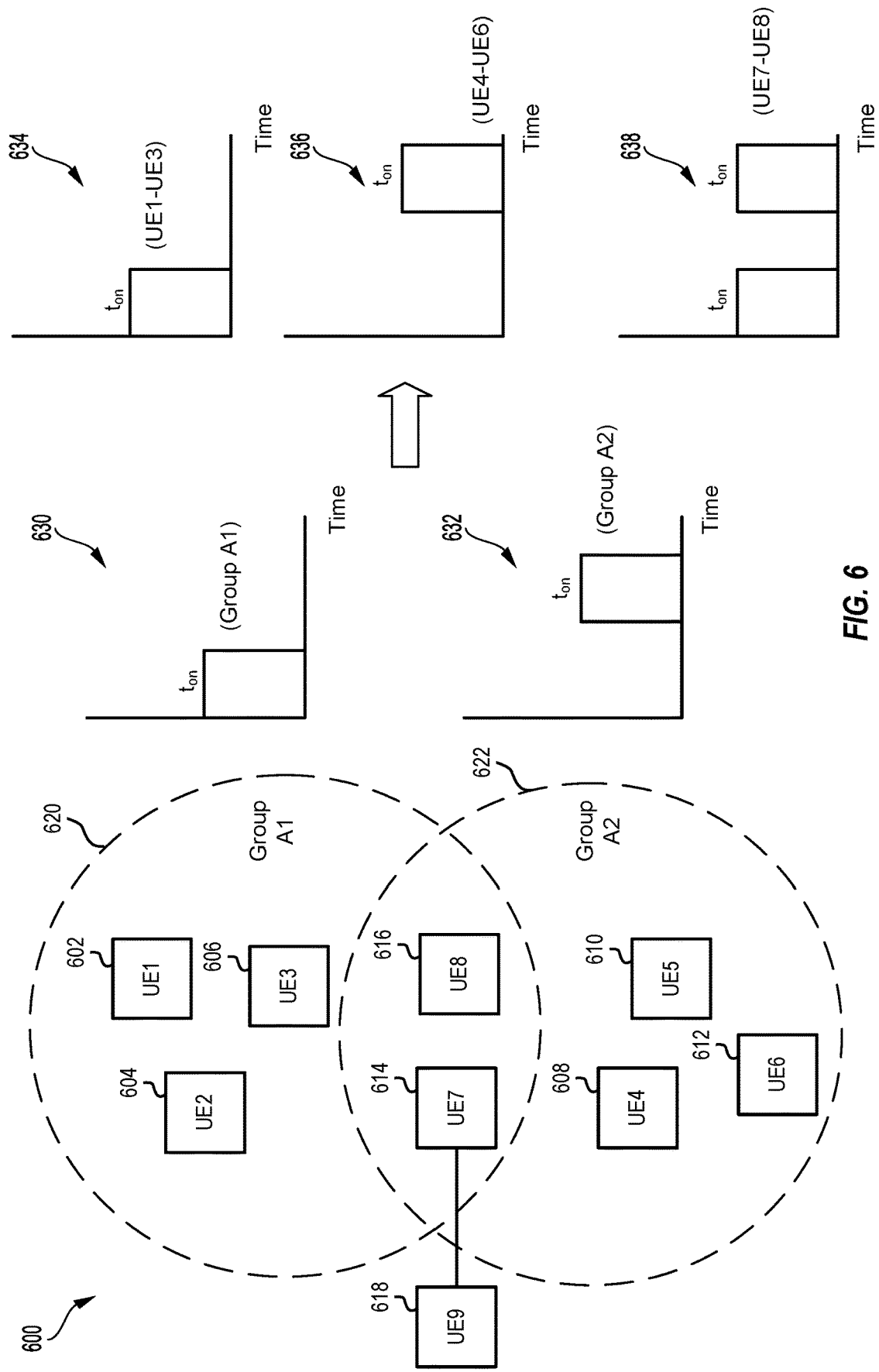
FIG. 6 is a block diagram illustrating details of a wireless communication system configured to align DRX cycles for UEs in multiple groups.

FIG. 6 is a block diagram of an example wireless communications system 600 configured to align DRX cycles for UEs in multiple groups. Wireless communications system 600 includes first UE 602 ("UE1"), second UE 604 ("UE2"), third UE 606 ("UE3"), fourth UE 608 ("UE4"), fifth UE 610 ("UE5"), sixth UE 612 ("UE6"), seventh UE 614 ("UE7"), eighth UE 616 ("UE8"), and ninth UE 618 ("UE9"). UEs 602-618 may include components similar to described in FIG. 3, such as processors, memories, transmitters, and receivers, which are not shown for convenience, Although nine UEs are illustrated, in other implementations, wireless communications system 600 may include fewer than nine or more than nine UEs, one or more base stations, or both.

During operation of wireless communications system 600, first UE 601, second UE 604, third UE 606, seventh UE 614, and eighth UE 616 form first group 620 of UEs ("Group A1"). Additionally, fourth UE 608, fifth UE 610, sixth UE 612, seventh UE 614, and eighth UE 616 form second group 622 of UEs ("Group A2"). Each of groups 620-622 correspond to different DRX cycles. For example, first group 620 corresponds to a first DRX cycle, as shown by graph 630, and second group 622 corresponds to a second DRX cycle, as shown by graph 632. The first DRX cycle and the second DRX cycle are determined based on group identifiers and a number of intervals (e.g., N) in the DRX cycle (e.g., T). For example, the DRX cycles may be determined based on the formula: Group $ID_i$ mod N, where Group $ID_i$ is a group identifier of group i. To further illustrate, the first DRX cycle may be determined based on a first group identifier of first group 620, and the second DRX cycle may be determined based on a second group identifier of second group 622.

UEs that are a member of a single group operate in accordance with the group's DRX cycle. UEs that are a member of multiple groups operate in accordance with each group's DRX cycle. For example, as shown by graph 634, first UE 602, second UE 604, and third UE 606 operate in accordance with the first DRX cycle of first group 620. As shown by graph 636, fourth UE 608, fifth UE 610, and sixth UE 612 operate in accordance with the second DRX cycle of second group 622. As shown by graph 638, seventh UE 614 and eighth UE 616 operate in accordance with a combination of the first DRX cycle and the second DRX cycle.

To illustrate, seventh UE 614 may associate with first group 620. First group 620 corresponds to a first DRX cycle. Seventh UE 614 may also associate with second group 622. Second group 622 corresponds to a second DRX cycle. Seventh UE 614 may perform one or more communications in accordance with a third DRX cycle. The third DRX cycle includes a combination of the first DRX cycle and the second DRX cycle. For example, seventh UE 614 may perform one or more operations in accordance with the third DRX cycle shown by graph 636, which is a combination of the first DRX cycle shown by graph 630 and the second DRX cycle shown by graph 632. To further illustrate, the first DRX cycle includes a first DRX on time period, the second DRX cycle includes a second DRX on time period different from the first DRX on time period, and the third DRX cycle includes the first DRX on time period and the second DRX on time period. In some implementations, the first DRX cycle is based on a first group identifier of first group 620 and a number of intervals of the first DRX cycle (e.g., N). In some such implementations, the first DRX cycle is determined based on a formula including: first group identifier mod number of intervals in the first DRX cycle (e.g., Group $ID_1$ mod N). Additionally, the second DRX cycle may be based on a second group identifier of second group 622 and a number of intervals in the second DRX cycle. In some such implementations, the second DRX cycle is determined based on a formula including: second group identifier mod number of intervals in the second DRX cycle (e.g., Group $ID_2$ mod N).

In some implementations, a UE that is in a group may associate with a UE that is not in the group, and the UE that is in the group may align the DRX cycle between the UEs to the DRX cycle of the group to improve power consumption at the UE in the group. For example, ninth UE 618 may associate with seventh UE 614, and seventh UE 614 may align the DRX cycle of ninth UE 618 with that of first group 620 or second group 622. The alignment of the DRX cycle may occur via the exchange of RRC messages, either as described with reference to FIG. 3 or as described with reference to FIG. 4. To illustrate, seventh UE 614 may receive, from ninth UE 618 via a unicast transmission, a RRC request that includes a first DRX preference at ninth UE 618. Seventh UE 614 may transmit, to ninth UE 618, a RRC setup message that includes a second DRX preference at seventh UE 614. The second DRX preference corresponds to at least a portion of the third DRX cycle (e.g., the combination of the first DRX cycle and the second DRX cycle). Seventh UE 614 may receive, from ninth UE 618, a RRC setup complete message that includes an indication of a confirmed DRX cycle. The confirmed DRX cycle overlaps with at least a portion of the third DRX cycle. One or more communications may be performed between seventh UE 614 and ninth UE 618 in accordance with the confirmed DRX cycle.

Thus, FIG. 6 describes how UEs that are members of groups perform DRX. For example, if a UE is a member of a single group, the UE operates in accordance with the DRX cycle of the group. If the UE is a member of multiple groups, the UE operates in accordance with a combination of the DRX cycles of the multiple groups. Although this increases power consumption at the UE, congestion in the wireless channel is reduced by spreading the communications over different time slots.

Figure 7:
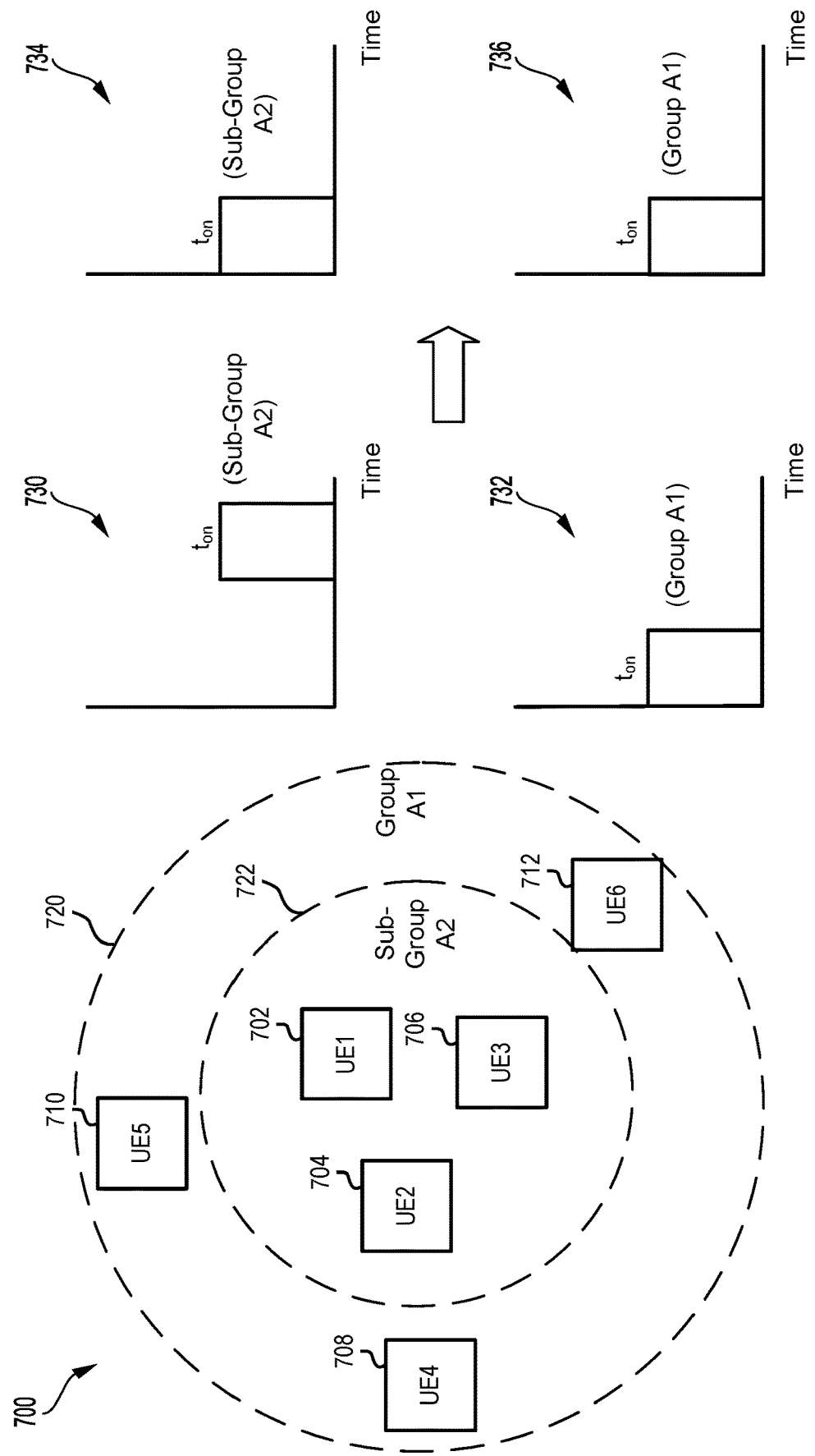
FIG. 7 is a block diagram illustrating details of a wireless communication system configured to align DRX cycles between a group of UEs and a sub-group of UEs.

FIG. 7 is a block diagram of an example wireless communications system 700 configured to align DRX cycles between a group of UEs and a sub-group of UEs. Wireless communications system 700 includes first UE 702 ("UE1"), second UE 704 ("UE2"), third UE 706 ("UE3"), fourth UE 708 ("UE4"), fifth UE 710 ("UE5"), and sixth UE 712 ("UE6"). UEs 702-712 may include components similar to described in FIG. 3, such as processors, memories, transmitters, and receivers, which are not shown for convenience, Although six UEs are illustrated, in other implementations, wireless communications system 700 may include fewer than six or more than six UEs, one or more base stations, or both.

During operation of wireless communications system 700, first UE 702, second UE 704, third UE 706, fourth UE 708, fifth UE 710, and sixth UE 712 form group 720 of UEs ("Group A1"). Additionally, first UE 702, second UE 704, and third UE 706 form sub-group 722 ("Sub-Group A2"). Sub-group 722 is referred to as a sub-group because each UE in sub-group 722 is also a member of group 720. Group 720 corresponds to a first DRX cycle, and sub-group 722 corresponds to a second DRX cycle that may be different than the first DRX cycle. For example, sub-group 722 corresponds to the second DRX cycle shown by graph 730, and group 720 corresponds to the first DRX cycle shown by graph 732. As illustrated in FIG. 7, when the first DRX cycle is different than the second DRX cycle, UEs 702-706 monitor a wireless channel (e.g., operate in an active operating mode) for two DRX on time periods, which increases power consumption at UEs 702-706. To decrease power consumption at UEs 702-706, a UE operating as a cluster head of sub-group 722 can provide a plurality of unicast messages or a groupcast message to other members of the sub-group to align the second DRX cycle of sub-group 722 with the first DRX cycle of group 720. For example, after alignment, the second DRX cycle and the first DRX cycle are the same, as shown by graph 736 and graph 734, respectively. The cluster head is able to align the DRX cycles because the cluster head has knowledge of each DRX cycle (e.g., can determine each DRX cycle based on Grou$pID_i$ mod N). Aligning the DRX cycles enables UEs 702-706 to monitor the wireless channel for only a single DRX on time period, which reduces power consumption at UEs of sub-group 722.

To illustrate, first UE 702 may associated with group 720. Group 720 corresponds to a first DRX cycle (e.g., as shown by graph 732). First UE 702 may also associate with sub-group 722 (e.g., a sub-group of the group of UEs). Sub-group 722 corresponds to a second DRX cycle that is different than the first DRX cycle (e.g., as shown by graph 730). First UE 702 transmits, to each UE of sub-group 722, a message indicating to transition to the first DRX cycle. For example, first UE 702 may operate as the cluster head of sub-group 722 and transmit a message indicating to align the second DRX cycle with the first DRX cycle. In some implementations, the message is a groupcast message (e.g., a message to each member of sub-group 722). In other implementations, transmitting the message includes transmitting the message as a unicast message to each UE of sub-group 722. The first DRX cycle is based on a group identifier of group 720 and a number of intervals in the first DRX cycle (e.g., the first DRX cycle is determined based on $GroupID_1$ mod N). The second DRX cycle is based on a group identifier of sub-group 722 and a number of intervals in the second DRX cycle (e.g., the second DRX cycle is determined based on $GroupID_2$ mod N). After alignment, both group 720 and sub-group 722 correspond to the first DRX cycle.

Thus, FIG. 7 describes a sub-group of UEs that aligns a DRX cycle with a DRX cycle of a group of UEs (of which UEs of the sub-group are members). Aligning the sub-group DRX cycle and the group DRX cycle reduces the number of DRX on time periods corresponding to UEs of the sub-group, which reduces power consumption at UEs of the sub-group.

Figure 8:
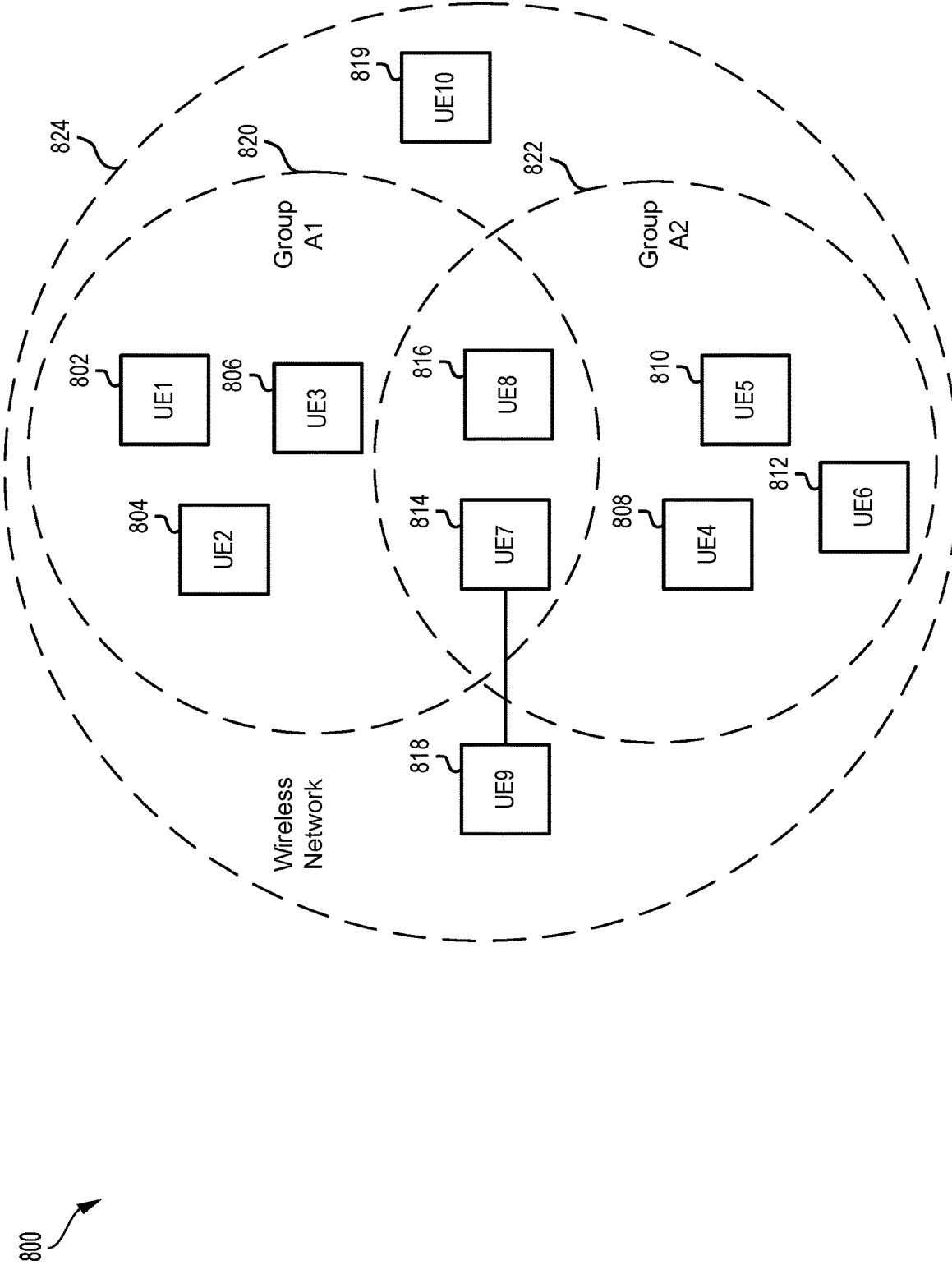
FIG. 8 is a block diagram illustrating details of a wireless communication system configured to align DRX cycles between UEs of a wireless network.

FIG. 8 is a block diagram of an example wireless communications system 800 configured to align DRX cycles between UEs of a wireless network. Wireless communications system 800 includes first UE 802 ("UE1"), second UE 804 ("UE2"), third UE 806 ("UE3"), fourth UE 808 ("UE4"), fifth UE 810 ("UE5"), sixth UE 812 ("UE6"), seventh UE 814 ("UE7"), eighth UE 816 ("UE8"), ninth UE 818 ("UE9"), and tenth UE 819 ("UE10"). UEs 802-819 may include components similar to described in FIG. 3, such as processors, memories, transmitters, and receivers, which are not shown for convenience, Although ten UEs are illustrated, in other implementations, wireless communications system 800 may include fewer than ten or more than ten UEs, one or more base stations, or both.

During operation of wireless communications system 800, first UE 802, second UE 804, third UE 806, seventh UE 814, and eighth UE 816 form a first group 820 of UEs ("Group A1"). Additionally, fourth UE 808, fifth UE 810, sixth UE 812, seventh UE 814, and eighth UE 816 form second group 822 of UEs ("Group A2"). First group 820 corresponds to (e.g., is scheduled to communicate during) a first DRX cycle, and second group 822 corresponds to (e.g., is scheduled to communicate during) a second DRX cycle that is different than the first DRX cycle. For example, as described with reference to FIG. 6, the DRX cycles for the groups may be determined based on GroupID$_i$ mod N. In addition, UEs 802-819 are members of wireless network 824. System configuration for wireless network 824 may define a third DRX cycle for broadcast messages within wireless network 824.

Due to the definition of the third DRX cycle for broadcast messages, each UE in wireless network 824 corresponds to at least one DRX cycle. For example, UEs that are only in first group 820 (e.g., UEs 802-806) correspond to a combination of the first DRX cycle (e.g., the DRX cycle for first group 820) and the third DRX cycle (e.g., the DRX cycle for broadcast messages). UEs that are only in second group 822 (e.g., UEs 808-812) correspond to a combination of the second DRX cycle (e.g., the DRX cycle for second group 822) and the third DRX cycle (e.g., the DRX cycle for broadcast messages). UEs that are in both first group 820 and second group 822 (e.g., seventh UE 814 and eighth UE 816) correspond to a combination of the first DRX cycle, the second DRX cycle, and the third DRX cycle. UEs that are not part of any group, such as ninth UE 818 (before connection with seventh UE 814) and tenth UE 819 correspond to the third DRX cycle (e.g., the DRX cycle of the broadcast messages). Although one or more group DRX cycles could be aligned with the third DRX cycle (e.g., the DRX cycle of the broadcast messages), doing so would increase congestion on a wireless channel, so the DRX cycles are not aligned. The DRX cycle of ninth UE 818 may be aligned with the DRX cycle of seventh UE 814, as described with reference to FIG. 3 or FIG. 4, to reduce power consumption at seventh UE 814.

To illustrate, seventh UE 814 of wireless network 824 may associate with first group 820. First group 820 corresponds to a first DRX cycle. Seventh UE 814 may also associate with second group 822. Second group 822 corresponds to a second DRX cycle. Broadcast messages within wireless network 824 correspond to a third DRX cycle. Seventh UE 814 may perform one or more communications (with other UEs) in accordance with a fourth DRX cycle. The fourth DRX cycle includes a combination of the first DRX cycle, the second DRX cycle, and the third DRX cycle. The first DRX cycle includes a first DRX on time period, the second DRX cycle includes a second DRX on time period, the third DRX cycle includes a third DRX on time period, and the fourth DRX cycle includes the first DRX on time period, the second DRX on time period, and the third DRX on time period. The first DRX cycle may be determined based on a first group identifier of first group 820 and a number of intervals in the first DRX cycle (e.g., GroupID$_1$ mod N). The second DRX cycle may be determined based on a second group identifier of second group 822 and a number of intervals in the second DRX cycle (e.g., GroupID$_2$ mod N).

In some implementations, seventh UE 814 may receive, from ninth UE 818 via a unicast transmission, a RRC request that includes a first DRX preference at ninth UE 818. Seventh UE 814 may transmit, to ninth UE 818, a RRC setup message that includes a second DRX preference at seventh UE 814. The second DRX preference corresponds to at least a portion of the fourth DRX cycle (e.g., the combination of the first DRX cycle, the second DRX cycle, and the third DRX cycle). Seventh UE 814 may also receive, from ninth UE 818, a RRC setup complete message that includes an indication of a confirmed DRX cycle. The confirmed DRX cycle overlaps with at least a portion of the fourth DRX cycle. One or more communications may be performed between seventh UE 814 and ninth UE 818 in accordance with the confirmed DRX cycle. In this manner, the DRX cycle between seventh UE 814 and ninth UE 818 may be aligned with the DRX cycle of seventh UE 814, which reduces power consumption at seventh UE 814 (as compared to adding another DRX on time period to the DRX cycle of seventh UE 814). Additionally, because ninth UE 818 is only one UE, and not a group of UEs, aligning the DRX cycles will not significantly increase the congestion on a wireless channel.

Thus, FIG. 8 describes how UEs adjust DRX cycles when a wireless network defines a DRX cycle for broadcast messages. For example, members groups may combine their DRX cycle with the broadcast messages DRX cycle instead of aligning the group DRX cycle with the broadcast messages DRX cycle. In this manner, congestion on a wireless channel is not increased.

Figure 9:
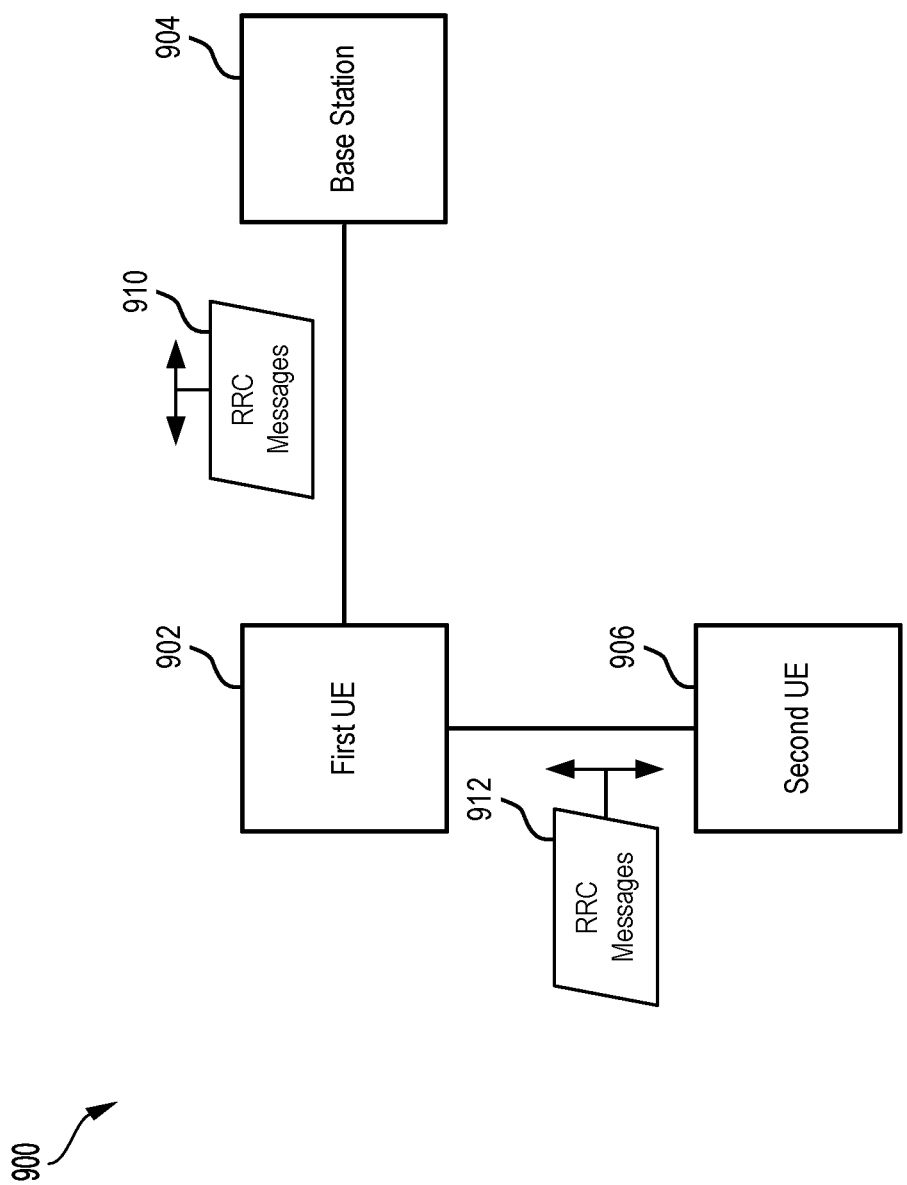
FIG. 9 is a block diagram illustrating details of a wireless communication system configured to align DRX cycles between a base station and UEs.

FIG. 9 is a block diagram of an example wireless communications system 900 configured to align DRX cycles between a base station and UEs. Wireless communications system 900 includes first UE 902, base station 904, and second UE 906. First UE 902, base station 904, and second UE 906 may include components similar to described in FIG. 3, such as processors, memories, transmitters, and receivers, which are not shown for convenience, Although two UEs and one base station are illustrated, in other implementations, wireless communications system 900 may include more than two UEs, more than one base station, or both.

During operation of wireless communications system 900, first UE 902 may associate with base station 904. During the association process, or after the association process, first UE 902 may exchange RRC message 910 with base station 904. RRC messages 910 may include RRC connection messages, RRC reconfiguration messages, or other types of RRC messages. Additionally, second UE 906 may associate with first UE 902 (e.g., via a sidelink). During, or after, the association process, first UE 902 and second UE 906 may exchange RRC messages 912. RRC messages 912 may include RRC connection messages, RRC reconfiguration messages, or other types of RRC messages.

In some implementations, base station 904 may assign first UE 902 a first DRX cycle, and during association with second UE 906, first UE 902 may align a second DRX cycle of second UE 906 with the first DRX cycle of first UE 902. For example, the alignment of DRX cycles may occur via exchange of RRC messages 912, as described with reference to FIG. 3 or with reference to FIG. 4. Aligning the DRX cycles reduces power consumption at first UE 902.

In some other implementations, first UE 902 may align the first DRX cycle of first UE 902 with the second DRX cycle of second UE 906. For example, after receiving an indication of the second DRX cycle (e.g., a DRX preference included in RRC messages 912), first UE 902 may request that base station 904 assign first UE 902 the second DRX cycle. For example, first UE 902 may include a DRX preference in RRC messages 910 to base station 904. Aligning the DRX cycles reduces power consumption at first UE 902.

In some other implementations, first UE 902 may operate in accordance with both DRX cycles. For example, first UE 902 may perform one or more communications with base station 904 in accordance with the first DRX cycle established by base station 904, and first UE 902 may perform one or more communications with second UE 906 in accordance with the second DRX cycle requested by second UE 906.

Although power consumption at first UE 902 may be increased (as compared to aligning DRX cycles), congestion on a wireless channel is decreased. In some implementations, first UE 902 may select how to handle the DRX cycles based on a remaining power level, a capability, a power supply, or other parameters, as described with reference to FIG. 5.

To illustrate, in some implementations, first UE 902 may associate with base station 904. Base station 904 assigns first UE 902 a first DRX cycle. First UE 902 may receive, from second UE 906, a RRC request (included in RRC messages 912) that includes a first DRX preference at second UE 906. First UE 902 may transmit, to second UE 906, a RRC setup message (included in RRC messages 912) that includes a second DRX preference at first UE 902. The second DRX preference matches at least a portion (e.g., a DRX on time period) of the first DRX cycle. First UE 902 may also receive, from second UE 906, a RRC setup complete message (included in RRC messages 912) that includes an indication of a confirmed DRX cycle. The confirmed DRX cycle matches at least a portion of the first DRX cycle. After receiving the RRC setup complete message, one or more communications may be performed between first UE 902 and second UE 906 in accordance with the confirmed DRX cycle. Thus, first UE 902 may align the second DRX cycle with the first DRX cycle assigned by base station 904. The RRC request may include a RRC connection request or a RRC reconfiguration request, the RRC setup message may include a RRC connection setup message or a RRC reconfiguration setup message, and the RRC setup complete message may include a RRC connection setup complete message or a RRC reconfiguration setup message.

In some other implementations, first UE 902 may receive, from a third UE, a second RRC request that includes a third DRX preference that does not match any portion of the first DRX cycle. First UE 902 may transmit, to base station 904, a first RRC message (included in RRC messages 910) that includes the third DRX preference. First UE 902 may also receive, from base station 904, a second RRC message (included in RRC messages 910) that assigns, to first UE 902, a second DRX cycle that conforms to the third DRX preference. Thus, first UE 902 may request that base station 904 align the first DRX cycle with the third DRX cycle requested by the third base station.

In some other implementations, first UE 902 may receive, from a fourth UE, a third RRC request (included in RRC messages 912) that includes a fourth DRX preference that does not match any portion of the first DRX cycle. First UE 902 may determine a second DRX cycle based on a combination of the first DRX cycle and the fourth DRX preference. For example, the second DRX cycle may include a combination of the first DRX cycle and the fourth DRX preference (e.g., a combination of DRX on times from the first DRX cycle and the fourth DRX preference). One or more communications may be performed between first UE 902 and the fourth UE in accordance with the second DRX cycle. Thus, first UE 902 may monitor a wireless channel in accordance with multiple DRX cycles (e.g., with a combination of multiple DRX cycles). Although this increase power consumption at first UE 902, congestion at a wireless channel is reduced.

Thus, FIG. 9 describes multiple implementations of determining DRX cycles at a UE that is associated with a base station and with a second UE. For example, the UE may align a DRX cycle of the second UE with a DRX cycle assigned to the first UE by the base station, which reduces power consumption at the UE. As another example, the UE may request that the base station align the DRX cycle assigned by the base station with the DRX cycle requested by the second UE, which reduces power consumption at the UE. As another example, the UE may monitor a wireless channel during multiple DRX cycles (e.g., the DRX cycle assigned by the base station and the DRX cycle requested by the second UE), which decreases congestion on a wireless channel.

Figure 17:
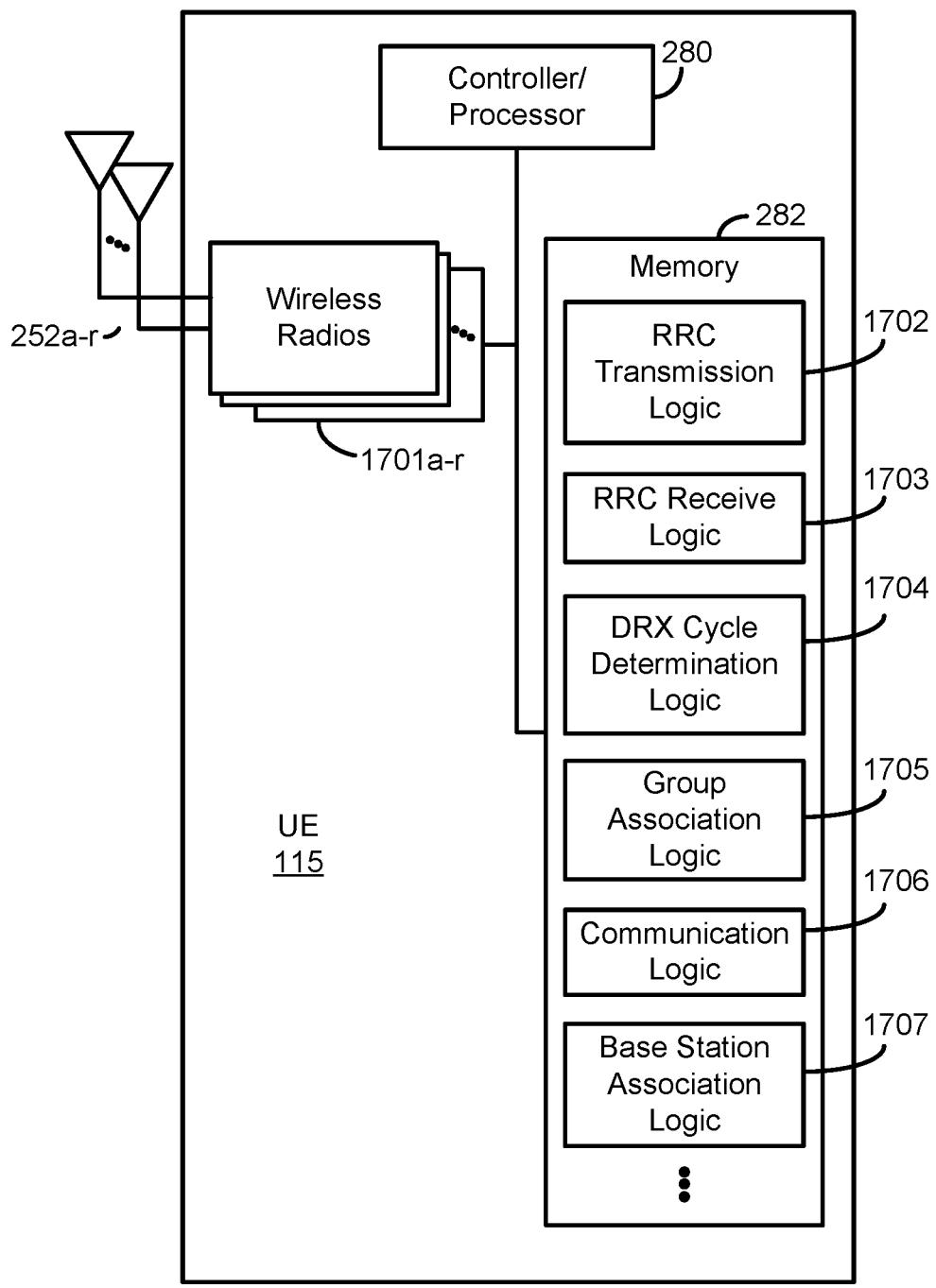
FIG. 17 is a block diagram conceptually illustrating a design of a UE according to some aspects of the present disclosure.

FIG. 10 is a block diagram illustrating example blocks executed to implement one aspect of the present disclosure. The example blocks will also be described with respect to UE 115 as illustrated in FIG. 17. FIG. 17 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1701*a-r* and antennas 252*a-r*. Wireless radios 1701*a-r* includes various components and hardware, as illustrated in FIG. 2 for UE 115, including modulator/demodulators 254*a-r*, MIMO detector 256, receive processor 258, transmit processor 264, and TX MIMO processor 266.

At block 1000, the UE transmits, to a second UE, a RRC request that includes a first DRX preference at the UE. The UE 115 may execute, under control of controller/processor 280, RRC transmission logic 1702 stored in memory 282. The execution environment of RRC transmission logic 1702 provides the functionality to transmit a RRC request that includes a first DRX preference at UE 115.

At block 1001, the UE receives, from the second UE, a RRC setup message that includes a second DRX preference at the second UE. The UE 115 may execute, under control of controller/processor 280, RRC receive logic 1703 stored in memory 282. The execution environment of RRC receive logic 1703 provides the functionality to receive a RRC setup message that includes a second DRX preference at the second UE.

At block 1002, the UE transmits, to the second UE, a RRC setup complete message that includes an indication of a confirmed DRX cycle. The UE 115 may execute, under control of controller/processor 280, RRC transmission logic 1702 stored in memory 282. The execution environment of RRC transmission logic 1702 provides the functionality to transmit, to the second UE, a RRC setup complete message that includes an indication of a confirmed DRX cycle. In some implementations, the UE 115 may execute, under control of controller/processor 280, DRX cycle determination logic 1704. In some such implementations, the execution environment of DRX cycle determination logic 1704 provides the functionality to determine a DRX cycle (e.g., the confirmed DRX cycle) based on the first DRX preference and the second DRX preference.

FIG. 11 is a block diagram illustrating example blocks executed to implement one aspect of the present disclosure. The example blocks will also be described with respect to UE 115 as illustrated in FIG. 17.

At block 1100, the UE transmits, to a second UE, a RRC request that includes an indication of an intent to perform DRX at the UE. The UE 115 may execute, under control of controller/processor 280, RRC transmission logic 1702 stored in memory 282. The execution environment of RRC transmission logic 1702 provides the functionality to transmit, to the second UE, a RRC request that includes an indication of an intent to perform DRX at the UE.

At block 1101, the UE receives, from the second UE, a RRC setup message that includes an indication of acceptance of the DRX. The UE 115 may execute, under control of controller/processor 280, RRC receive logic 1703 stored in memory 282. The execution environment of RRC receive logic 1703 provides the functionality to receive, from the second UE, a RRC setup message that includes an indication of acceptance of the DRX.

At block 1102, the UE transmits, to the second UE, a RRC setup complete message that includes a confirmation of the intent to perform DRX. The UE 115 may execute, under control of controller/processor 280, RRC transmission logic 1702 stored in memory 282. The execution environment of RRC transmission logic 1702 provides the functionality to transmit, to the second UE, a RRC setup complete message that includes a confirmation of the intent to perform DRX. In some implementations, the UE 115 may execute, under control of controller/processor 280, DRX cycle determination logic 1704 stored in memory 282. The execution environment of DRX cycle determination logic 1704 provides the functionality to determine a DRX cycle with which to operate at the UE after the second UE accepts performance of DRX.

Figures 12, 13:
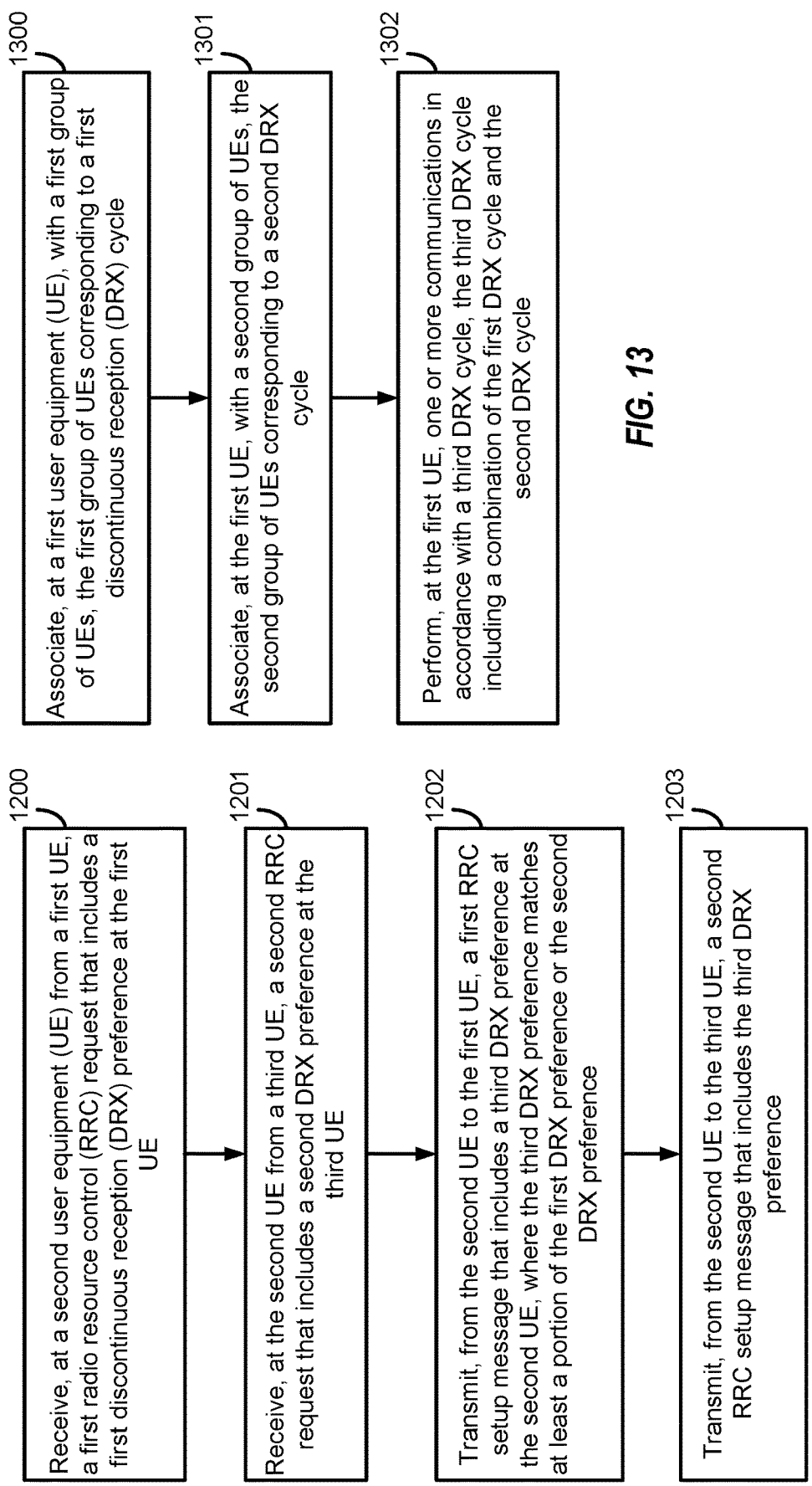
FIG. 12 is a block diagram illustrating example blocks of a method of aligning DRX cycles between multiple UEs according to some aspects of the present disclosure.
FIG. 13 is a block diagram illustrating example blocks of a method of determining a DRX cycle based on groups of UEs according to some aspects of the present disclosure.

FIG. 12 is a block diagram illustrating example blocks executed to implement one aspect of the present disclosure. The example blocks will also be described with respect to UE 115 as illustrated in FIG. 17.

At block 1200, a second UE (e.g., the UE) receives, from a first UE, a first RRC request that includes a first DRX preference at the first UE. The UE 115 may execute, under control of controller/processor 280, RRC receive logic 1703 stored in memory 282. The execution environment of RRC receive logic 1703 provides the functionality to receive, from a first UE, a first RRC request that includes a first DRX preference at the first UE.

At block 1201, the second UE (e.g., the UE) receives, from a third UE, a second RRC request that includes a second DRX preference at the third UE. The UE 115 may execute, under control of controller/processor 280, RRC receive logic 1703 stored in memory 282. The execution environment of RRC receive logic 1703 provides the functionality to receive, from a third UE, a second RRC request that includes a second DRX preference at the third UE.

At block 1202, the second UE (e.g., the UE) transmits, to the first UE, a first RRC setup message that includes a third DRX preference at the second UE. The third DRX preference matches at least a portion of the first DRX preference or the third DRX preference. The UE 115 may execute, under control of controller/processor 280, RRC transmission logic 1702 stored in memory 282. The execution environment of RRC transmission logic 1702 provides the functionality to transmit, to the first UE, a first RRC setup message that includes a third DRX preference at UE 115. The third DRX preference matches at least a portion of the first DRX preference or the third DRX preference (e.g., a DRX on time of the third DRX preference matches a DRX on time, or a portion thereof, of the first DRX preference or a DRX on time, or a portion thereof, of the second DRX preference).

At block 1203, the second UE (e.g., the UE) transmits, to the third UE, a second RRC setup message that includes the third DRX preference. The UE 115 may execute, under control of controller/processor 280, RRC transmission logic 1702 stored in memory 282. The execution environment of RRC transmission logic 1702 provides the functionality to transmit, to the third UE, a second RRC setup message that includes the third DRX preference.

FIG. 13 is a block diagram illustrating example blocks executed to implement one aspect of the present disclosure. The example blocks will also be described with respect to UE 115 as illustrated in FIG. 17.

At block 1300, the UE associates with a first group of UEs. The first group of UEs corresponds to a first DRX cycle. The UE 115 may execute, under control of controller/processor 280, group association logic 1705 stored in memory 282. The execution environment of group association logic 1705 provides the functionality to associate with a first group of UEs that corresponds to a first DRX cycle.

At block 1301, the UE associates with a second group of UEs. The second group of UEs correspond to a second DRX cycle. The UE 115 may execute, under control of controller/processor 280, group association logic 1705 stored in memory 282. The execution environment of group association logic 1705 provides the functionality to associate with a second group of UEs that corresponds to a second DRX cycle.

At block 1302, the UE performs one or more communications in accordance with a third DRX cycle. The third DRX cycle includes a combination of the first DRX cycle and the second DRX cycle. The UE 115 may execute, under control of controller/processor 280, communication logic 1706 stored at memory 282. The execution environment of communication logic 1706 provides the functionality to perform one or more communications in accordance with a third DRX cycle that includes a combination of the first DRX cycle and the second DRX cycle (e.g., that includes a first DRX on time period of the first DRX cycle and a second DRX on time period of the second DRX cycle).

FIG. 14 is a block diagram illustrating example blocks executed to implement one aspect of the present disclosure. The example blocks will also be described with respect to UE 115 as illustrated in FIG. 17.

At block 1400, the UE associates with a group of UEs. The group of UEs corresponds to a first DRX cycle. The UE 115 may execute, under control of controller/processor 280, group association logic 1705 stored in memory 282. The execution environment of group association logic 1705 provides the functionality to associate with a group of UEs that corresponds to a first DRX cycle.

At block 1401, the UE associates with a sub-group of the group of UEs. The sub-group corresponds to a second DRX cycle different from the first DRX cycle. The UE 115 may execute, under control of controller/processor 280, group association logic 1705 stored in memory 282. The execution environment of group association logic 1705 provides the functionality to associate with a sub-group of the group of UEs. The sub-group corresponds to a second DRX cycle different from the first DRX cycle.

At block 1402, the UE transmits, to each UE of the sub-group, a message indicating to transition to the first DRX cycle. The UE 115 may execute, under control of controller/processor 280, RRC transmission logic 1702 stored in memory 282. The execution environment of RRC transmission logic 1702 provides the functionality to transmit, to each UE of the sub-group, a message indicating to transition to the first DRX cycle.

FIG. 15 is a block diagram illustrating example blocks executed to implement one aspect of the present disclosure. The example blocks will also be described with respect to UE 115 as illustrated in FIG. 17.

At block 1500, the UE associations with a first group of UEs. The first group of UEs corresponds to a first DRX cycle. The UE 115 may execute, under control of controller/processor 280, group association logic 1705 stored in memory 282. The execution environment of group association logic 1705 provides the functionality to associate with a first group of UEs that corresponds to a first DRX cycle.

At block 1501, the UE associates with a second group of UEs. The second group of UEs corresponds to a second DRX cycle. Broadcast messages within a wireless network (that includes the UE) correspond to a third DRX cycle. The UE 115 may execute, under control of controller/processor 280, group association logic 1705 stored in memory 282. The execution environment of group association logic 1705 provides the functionality to associate with a second group of UEs that correspond to a second DRX cycle. Broadcast messages of a wireless network (that includes UE 115) correspond to a third DRX cycle.

At block 1502, the UE performs one or more communications in accordance with a fourth DRX cycle. The fourth DRX cycle includes a combination of the first DRX cycle, the second DRX cycle, and the third DRX cycle. The UE 115 may execute, under control of controller/processor 280, communication logic 1706 stored in memory 282. The execution environment of communication logic 1706 provides the functionality for UE 115 to perform one or more communication in accordance with a fourth DRX cycle. The fourth DRX cycle includes a combination of the first DRX cycle, the second DRX cycle, and the third DRX cycle (e.g., a combination of a DRX on time period of the first DRX cycle, a DRX on time period of the second DRX cycle, and a DRX on time period of the third DRX cycle).

Figure 16:
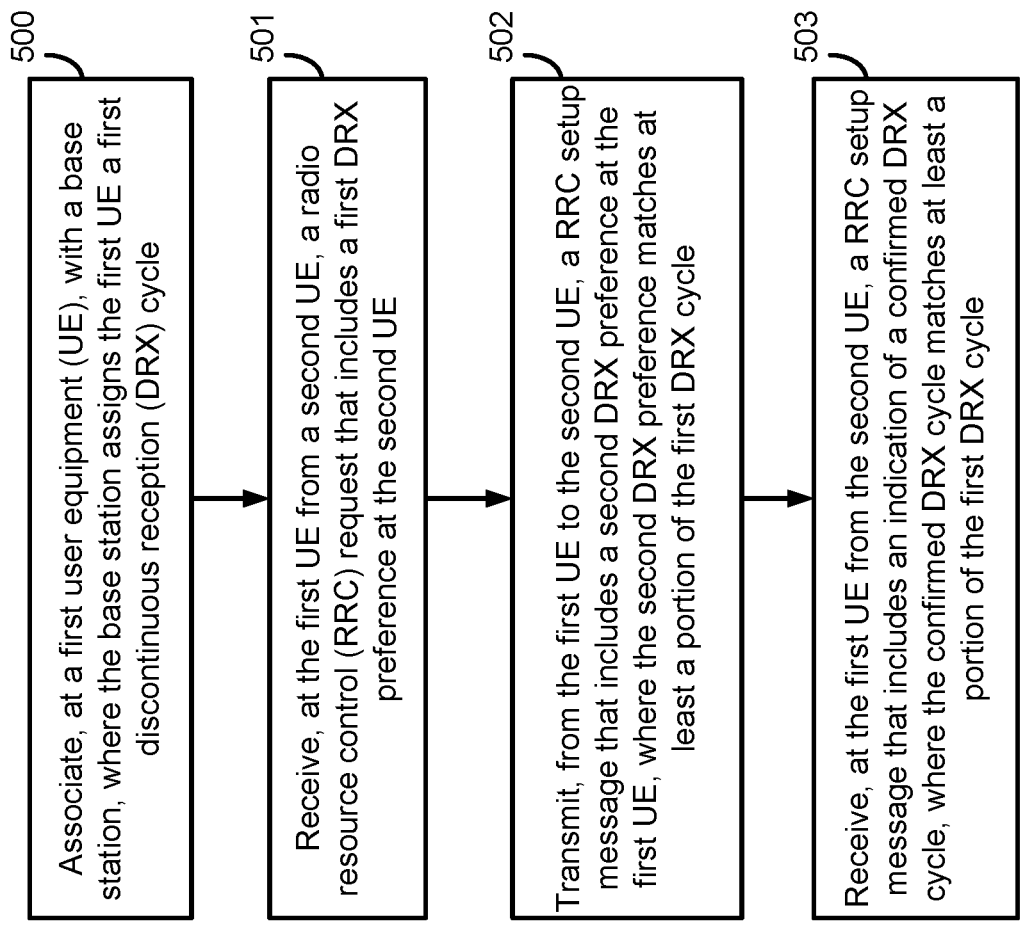
FIG. 16 is a block diagram illustrating example blocks of a method of determining a DRX cycle between a base station and a UE according to some aspects of the present disclosure.

FIG. 16 is a block diagram illustrating example blocks executed to implement one aspect of the present disclosure. The example blocks will also be described with respect to UE 115 as illustrated in FIG. 17.

At block 1600, the UE associates with a base station. The base station assigns the UE a first DRX cycle. The UE 115 may execute, under control of controller/processor 280, base station association logic 1707 stored in memory 282. The execution environment of base station association logic 1707 provides the functionality to associate with a base station. The base station assigns UE 115 a first DRX cycle.

At block 1601, the UE receives, from a second UE, a RRC request that includes a first DRX preference at the second UE. The UE 115 may execute, under control of controller/processor 280, RRC receive logic 1703 stored in memory 282. The execution environment of RRC receive logic 1703 provides the functionality to receive, from a second UE, a RRC request that includes a first DRX preference at the second UE.

At block 1602, the UE transmits, to the second UE, a RRC setup message that includes a second DRX preference at the first UE. The second DRX preference matches at least a portion of the first DRX cycle. The UE 115 may execute, under control of controller/processor 280, RRC transmission logic 1702 stored in memory 282. The execution environment of RRC transmission logic 1702 provides the functionality to transmit, to the second UE, a RRC setup message that includes a second DRX preference at the first UE. The second DRX preference matches at least a portion of the first DRX cycle (e.g., a DRX on time period of the second DRX preference matches at least a portion of a DRX on time period of the first DRX cycle).

At block 1603, the UE receives, from the second UE, a RRC setup complete message that includes an indication of a confirmed DRX cycle. The confirmed DRX cycle matches at least a portion of the first DRX cycle. The UE 115 may execute, under control of controller/processor 280, RRC receive logic 1703 stored in memory 282. The execution environment of RRC receive logic 1703 provides the functionality to receive, from the second UE, a RRC setup complete message that includes an indication of a confirmed DRX cycle. The confirmed DRX cycle matches at least a portion of the first DRX cycle (e.g., a DRX on time period of the confirmed DRX cycle matches at least a portion of a DRX on time period of the first DRX cycle).

In some aspects, techniques for enabling DRX cycle alignment may include additional aspects, such as any single aspect or any combination of aspects described below or in connection with one or more other processes or devices described elsewhere herein. In a first aspect, techniques for enabling DRX alignment may include transmitting, from a first UE to a second UE, a RRC request that includes a first DRX preference at the first UE. The techniques of the first aspect may also include receiving, at the first UE from the second UE, a RRC setup message that includes a second DRX preference at the second UE. The techniques of the first aspect may further include transmitting, from the first UE to the second UE, a RRC setup complete message that includes an indication of a confirmed DRX cycle. In some examples, the techniques of the first aspect may be implemented in a method or process. In some other examples, the techniques of the first aspect may be implemented in a wireless communication device such as a UE or a component of a UE. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein.

In a second aspect, alone or in combination with the first aspect, the techniques include performing, between the first UE and the second UE, one or more communications in accordance with the confirmed DRX cycle.

In a third aspect, alone or in combination with one or more of the first through second aspects, the RRC request includes a RRC connection request or a RRC reconfiguration request.

In a fourth aspect, alone or in combination with one or more of the first through third aspects, the techniques include determining the confirmed DRX cycle based on the first DRX preference and the second DRX preference.

In a fifth aspect, in combination with the fourth aspect, the confirmed DRX cycle includes at least a portion of overlap between the first DRX preference and the second DRX preference.

In a sixth aspect, alone or in combination with one or more of the first through fifth aspects, transmitting the RRC request, receiving the RRC setup message, and transmitting the RRC setup complete message are performed during a unicast messaging process between the first UE and the second UE.

In a seventh aspect, alone or in combination with one or more of the first through sixth aspects, the techniques include transmitting, from the first UE to a third UE, a second RRC request that includes a third DRX preference at the first UE, receiving, at the first UE from the third UE, a second RRC setup message that includes an indication of a denial of setup, and terminating a unicast messaging process between the first UE and the third UE.

In an eighth aspect, techniques for enabling DRX alignment may include transmitting, from a first UE to a second UE, a RRC request that includes an indication of an intent to perform DRX at the first UE. The techniques of the eighth aspect may also include receiving, at the first UE from the second UE, a RRC setup message that includes an indication of acceptance of the DRX. The techniques of the eighth aspect may further include transmitting, from the first UE to the second UE, a RRC setup complete message that includes a confirmation of the intent to perform DRX. In some examples, the techniques of the eighth aspect may be implemented in a method or process. In some other examples, the techniques of the eighth aspect may be implemented in a wireless communication device such as a UE or a component of a UE. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein.

In a ninth aspect, alone or in combination with the eighth aspect, the RRC request includes a RRC connection request or a RRC reconfiguration request.

In a tenth aspect, alone or in combination with one or more of the seventh through ninth aspects, the techniques include performing, at the first UE, DRX according to a DRX cycle determined based on a particular identifier and a number of intervals in the DRX cycle.

In an eleventh aspect, in combination with the tenth aspect, the number of intervals in the DRX cycle is preconfigured at a system level, and the DRX cycle is determined based on a formula including: particular identifier mod number of intervals in the DRX cycle.

In a twelfth aspect, alone or in combination with one or more of the tenth through eleventh aspects, the particular identifier includes an identifier of the first UE.

In a thirteenth aspect, alone or in combination with one or more of the tenth through eleventh aspects, the particular identifier includes an identifier of the second UE.

In a fourteenth aspect, alone or in combination with one or more of the tenth through eleventh aspects, the particular identifier is based on a connection identifier between the first UE and the second UE.

In a fifteenth aspect, alone or in combination with one or more of the tenth through eleventh aspects, the particular identifier is specified by a wireless standard.

In a sixteenth aspect, alone or in combination with one or more of the tenth through fifteenth aspects, the techniques include performing, between the first UE and the second UE, one or more communications in accordance with the DRX cycle.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIG. 2) may comprise processors, electronics devices, hardware devices, electronics components, logical circuits, memories, software codes, firmware codes, etc., or any combination thereof. In addition, features discussed herein relating to FIGS. 1-17 may be implemented via specialized processor circuitry, via executable instructions, and/or combinations thereof.

Those of skill would further appreciate that the various illustrative logical blocks, modules, circuits, and algorithm steps (e.g., the logical blocks in FIGS. 1-16) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method of wireless communication, the method comprising:
    transmitting, from a first user equipment (UE) to a second UE, first information that indicates a first discontinuous reception (DRX) preference at the first UE;
    receiving, at the first UE from the second UE, second information that indicates a second DRX preference at the second UE; and
    transmitting, from the first UE to the second UE, an indicator of a confirmed DRX cycle, wherein the confirmed DRX cycle includes at least a portion of overlap between the first DRX preference and the second DRX preference.

2. The method of claim 1, further comprising performing, between the first UE and the second UE, one or more communications in accordance with the confirmed DRX cycle.

3. The method of claim 1, wherein the first information includes a radio resource control (RRC) connection request or a RRC reconfiguration request.

4. The method of claim 1, further comprising determining the confirmed DRX cycle based on the first DRX preference and the second DRX preference.

5. The method of claim 1, wherein transmitting the first information, receiving the second information, and transmitting the indicator are performed during a unicast messaging process between the first UE and the second UE.

6. The method of claim 1, further comprising:
    transmitting, from the first UE to a third UE, third information that indicates a third DRX preference at the first UE;
    receiving, at the first UE from the third UE, fourth information that indicates a denial of setup; and
    terminating a unicast messaging process between the first UE and the third UE.

7. The method of claim 1, wherein:
    transmitting the first information includes transmitting a first radio resource control (RRC) message that includes the first information;
    receiving the second information includes receiving a second RRC message that includes the second information; and
    transmitting the indicator includes transmitting a third RRC message that includes the indicator.

8. The method of claim 7, wherein:
    the first RRC message includes an RRC request;
    the second RRC message includes an RRC setup message; and
    the third RRC message include an RRC setup complete message.

9. The method of claim 7, wherein the first RRC message, the second RRC message, and the third RRC message are communicated via sidelink communication between the first UE and the second UE.

10. The method of claim 1, wherein:
    the first DRX preference is based on a reference time negotiated between the first UE and the second UE, and
    the second DRX preference is based on the reference time.

11. An apparatus configured for wireless communication, the apparatus comprising:
    at least one processor; and
    a memory coupled to the at least one processor,
    wherein the at least one processor is configured to:
        initiate transmission, from a first user equipment (UE) to a second UE, of first information that indicates a first discontinuous reception (DRX) preference at the first UE;
        receive, at the first UE from the second UE, second information that indicates a second DRX preference at the second UE; and
        initiate transmission, from the first UE to the second UE, of an indicator of a confirmed DRX cycle, wherein the confirmed DRX cycle includes at least a portion of overlap between the first DRX preference and the second DRX preference.

12. The apparatus of claim 11, wherein the at least one processor is further configured to initiate performance, between the first UE and the second UE, of one or more communications in accordance with the confirmed DRX cycle.

13. The apparatus of claim 11, wherein the first information includes a radio resource control (RRC) connection request or a RRC reconfiguration request.

14. The apparatus of claim 11, wherein the at least one processor is further configured to determine the confirmed DRX cycle based on the first DRX preference and the second DRX preference.

15. The apparatus of claim 11, wherein transmitting the first information, receiving the second information, and transmitting the indicator are performed during a unicast messaging process between the first UE and the second UE.

16. The apparatus of claim 11, wherein the at least one processor is further configured to:
   initiate transmission, from the first UE to a third UE, of third information that indicates a third DRX preference at the first UE;
   receive, at the first UE from the third UE, fourth information that indicates a denial of setup; and
   terminate a unicast messaging process between the first UE and the third UE based on receipt of the fourth information.

17. A method of wireless communication, the method comprising:
   transmitting, from a first user equipment (UE) to a second UE, first information that indicates an intent to perform discontinuous reception (DRX) at the first UE;
   receiving, at the first UE from the second UE, second information that indicates acceptance of the DRX;
   transmitting, from the first UE to the second UE, an indicator that indicates a confirmation of the intent to perform DRX; and
   performing, at the first UE, DRX according to a DRX cycle determined based on a particular identifier and a number of intervals in the DRX cycle, the particular identifier associated with sidelink communication between the first UE and the second UE.

18. The method of claim 17, wherein the first information includes a radio resource control (RRC).

19. The method of claim 17, wherein the number of intervals in the DRX cycle is preconfigured at a system level, and wherein the DRX cycle is determined based on a formula including:
   particular identifier mod number of intervals in the DRX cycle.

20. The method of claim 17, wherein the particular identifier includes an identifier of the first UE or of the second UE.

21. The method of claim 17, wherein the particular identifier is based on a connection identifier between the first UE and the second UE.

22. The method of claim 17, wherein the particular identifier is specified by a wireless standard.

23. The method of claim 17, further comprising performing, between the first UE and the second UE, one or more communications in accordance with the DRX cycle.

24. The method of claim 17, wherein the DRX cycle determined based on the particular identifier and the number of intervals in the DRX cycle includes the DRX cycle determined based on the particular identifier mod the number of intervals in the DRX cycle.

25. The method of claim 17, wherein the particular identifier includes a connection identifier between the first UE and the second UE.

26. An apparatus configured for wireless communication, the apparatus comprising:
   at least one processor; and
   a memory coupled to the at least one processor,
   wherein the at least one processor is configured to:
      initiate transmission, from a first user equipment (UE) to a second UE, first information of an intent to perform discontinuous reception (DRX) at the first UE;
      receive, at the first UE from the second UE, second information that indicates acceptance of the DRX;
      initiate transmission, from the first UE to the second UE, third information that indicates a confirmation of the intent to perform DRX; and
      perform, at the first UE, DRX according to a DRX cycle determined based on a particular identifier and a number of intervals in the DRX cycle, the particular identifier associated with sidelink communication between the first UE and the second UE.

27. The apparatus of claim 26, wherein the number of intervals in the DRX cycle is preconfigured at a system level, and wherein the DRX cycle is determined based on a formula including:
   particular identifier mod number of intervals in the DRX cycle.

28. The apparatus of claim 26, wherein the particular identifier includes an identifier of the first UE or an identifier of the second UE.

29. The apparatus of claim 26, wherein the particular identifier is based on a connection identifier between the first UE and the second UE or is specified by a wireless standard.

30. The apparatus of claim 26, wherein the at least one processor is further configured to initiate performance, between the first UE and the second UE, of one or more communications in accordance with the DRX cycle.

* * * * *